(12) United States Patent  
Onaka et al.

(10) Patent No.: US 7,843,631 B2
(45) Date of Patent: Nov. 30, 2010

(54) GAIN CONTROL APPARATUS, OPTICAL TRANSMISSION APPARATUS, GAIN CONTROL METHOD FOR OPTICAL AMPLIFIER, AND WAVELENGTH MULTIPLEX OPTICAL TRANSMISSION SYSTEM

(75) Inventors: Miki Onaka, Kawasaki (JP); Hideaki Sugiya, Kawasaki (JP); Yasushi Sugaya, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 11/859,842

(22) Filed: Sep. 24, 2007

(65) Prior Publication Data
US 2008/0239469 A1 Oct. 2, 2008

(30) Foreign Application Priority Data
Mar. 30, 2007 (JP) ............................. 2007-092778

(51) Int. Cl.
*H04B 10/17* (2006.01)
*H04B 10/12* (2006.01)
(52) U.S. Cl. ................................. 359/341.41
(58) Field of Classification Search ............. 359/341.41
See application file for complete search history.

(56) References Cited

U.S. PATENT DOCUMENTS

| 5,933,270 | A | 8/1999 | Toyohara | |
|---|---|---|---|---|
| 6,204,959 | B1* | 3/2001 | Fujita et al. | 359/337.2 |
| 6,433,925 | B1* | 8/2002 | Sakano et al. | 359/341.43 |
| 6,614,587 | B1* | 9/2003 | Yu et al. | 359/337.12 |
| 6,639,716 | B1 | 10/2003 | Tomofuji | |
| 7,064,890 | B2 | 6/2006 | Kakui | |
| 2002/0021488 | A1* | 2/2002 | Sugawara | 359/337.11 |
| 2002/0027704 | A1* | 3/2002 | Kobayashi et al. | 359/341.1 |
| 2002/0080475 | A1* | 6/2002 | Cornelius et al. | 359/341.41 |

(Continued)

FOREIGN PATENT DOCUMENTS

JP 10-173597 6/1998

(Continued)

OTHER PUBLICATIONS

M. Nishihara, et al., "Characterization and New Nunierical Model of Spectral Hole Burning in Broadband Erbium-Doped Fiber Amplifier", Optical Society of America, p. 204-206, Jul. 6-9, 2003.

(Continued)

*Primary Examiner*—Eric Bolda
(74) *Attorney, Agent, or Firm*—Staas & Halsey LLP

(57) ABSTRACT

The present invention relates to an apparatus for controlling a gain of an optical amplifier, and the apparatus comprises a target gain calculating unit for calculating, as a target gain for an optical amplifier, a value obtained by increasing or decreasing a gain (output) of signal light as the number of wavelengths of wavelength-multiplexed signal light decreases, and a control signal outputting unit for outputting a control signal to the optical amplifier so as to amplify the wavelength-multiplexed signal light with the target gain calculated by the target gain calculating unit. This promptly suppresses a fluctuation of signal light level, particularly, a fluctuation of output light power of an optical amplifier stemming from a variation of the number of wavelengths of wavelength-multiplexed signal light.

14 Claims, 16 Drawing Sheets

U.S. PATENT DOCUMENTS

| | | | |
|---|---|---|---|
| 2003/0099032 A1* | 5/2003 | Asao et al. | 359/341.4 |
| 2003/0133182 A1* | 7/2003 | Ng et al. | 359/341.41 |
| 2003/0151799 A1* | 8/2003 | Wight et al. | 359/334 |
| 2003/0223106 A1* | 12/2003 | Lee et al. | 359/341.33 |
| 2004/0234262 A1* | 11/2004 | Bortz | 398/45 |
| 2004/0240041 A1* | 12/2004 | Tian et al. | 359/337 |
| 2006/0203329 A1* | 9/2006 | Nishihara et al. | 359/337 |

FOREIGN PATENT DOCUMENTS

| | | |
|---|---|---|
| JP | 11-337750 | 12/1999 |
| JP | 2000-232433 | 8/2000 |
| JP | 2001044938 A * | 2/2001 |
| JP | 2001-168841 | 6/2001 |
| JP | 2003-258348 | 9/2003 |

OTHER PUBLICATIONS

M. Nishihara, et al., "Impact of Spectral Hole Burning in Multi-Channel Amplification of EDFA", Optical Society of America, Feb. 22-27, 2004.

Maxim Bolshtyansky, "Spectral Hole Burning in Erbium-Doped Fiber Amplifiers", Journal of Lightwave Technology, vol. 21, No. 4, p. 1032-1038, Apr. 2003.

* cited by examiner

FIG. 3(B) CONVENTIONAL
FIG. 3(C) PRESENT INVENTION
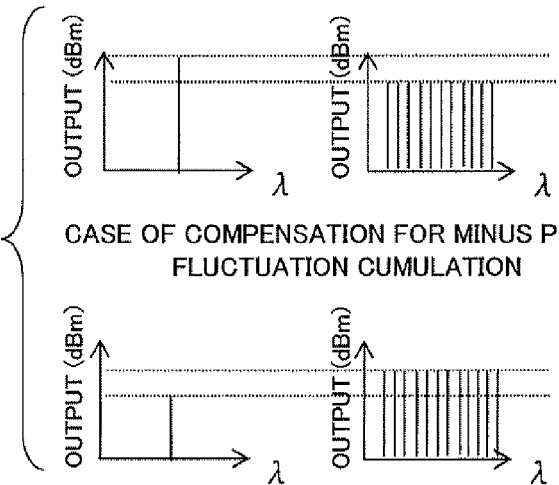
CASE OF COMPENSATION FOR MINUS POWER FLUCTUATION CUMULATION
CASE OF COMPENSATION FOR PLUS POWER FLUCTUATION CUMULATION

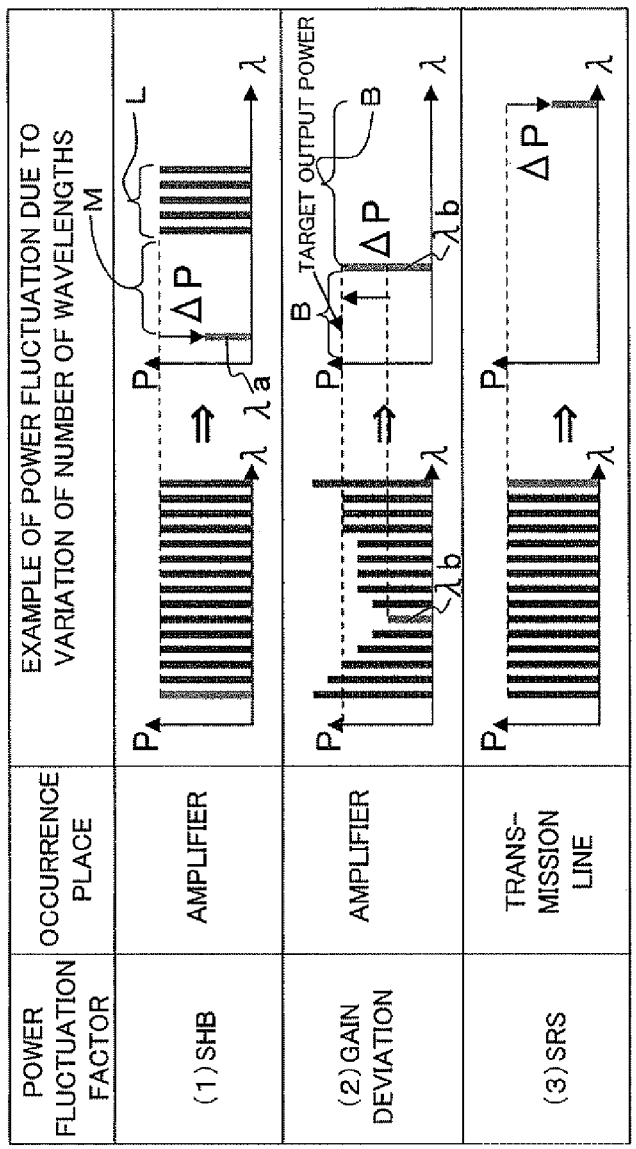
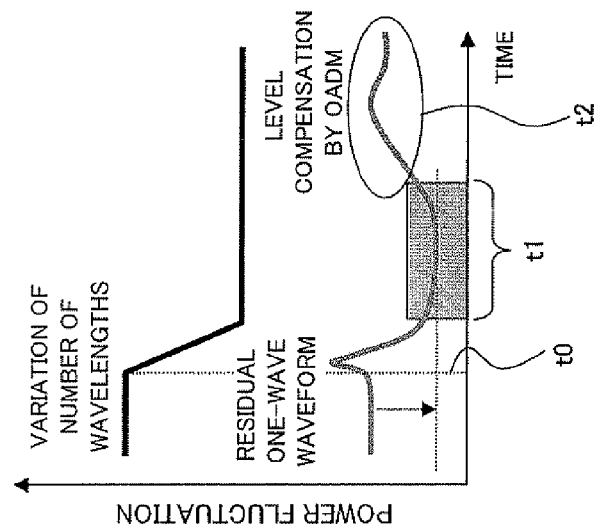

GAIN CONTROL APPARATUS, OPTICAL TRANSMISSION APPARATUS, GAIN CONTROL METHOD FOR OPTICAL AMPLIFIER, AND WAVELENGTH MULTIPLEX OPTICAL TRANSMISSION SYSTEM

BACKGROUND OF THE INVENTION

1) Field of the Invention

The present invention relates to a gain control apparatus, optical transmission apparatus and gain control method for optical amplifier, and more particularly to a technique suitable for use in a WDM (Wavelength Division Multiplex) optical transmission system for achieving long-distance transmission by using optical fiber amplifiers, represented by the Erbium-doped fiber amplifiers (EDFAs), in a multi-stage fashion.

2) Description of the Related Art

In recent years, as one example of a WDM optical transmission system, attention has been attracted with respect to a metrocore system which makes connections among local based cities and which is capable of carrying out the add/drop of optical signals with arbitrary wavelengths at arbitrary nodes. FIG. 7 is a block diagram showing an example of a configuration of a metrocore system. In this system shown in FIG. 7, OADM nodes 100, which are a plurality of optical transmission apparatus, are connected through transmission lines (optical fibers) 110 into a ring-like configuration so that, at each of the OADM nodes 110, a signal light with an arbitrary wavelength (channel) can be added to the transmission line 110 and, of WDM signal light propagating along the transmission lines 110, a signal light with an arbitrary wavelength can be dropped therefrom.

In addition, each of the OADM nodes 100 is composed of an OADM unit 101 which carries out the add/drop of a signal light, a front-end amplification unit 102a serving as a pre-amplifier located at a former and a latter stage of the OADM unit 101, and a back-end amplification unit 102b serving as a post-amplifier (when discrimination is not made between these amplification units 102a and 102b, they will be referred to as optical amplification units 102). The amplification operations of these optical amplification units 102 enable compensating for the loss of the signal light level between the OADM nodes (sometimes, each of which will hereinafter be referred to simply as a "node") 100 adjoining to each other, thereby lengthening the transmission distance.

Still additionally, in the case of the above-mentioned system enabling the add/drop of a signal light at an arbitrary node 100, the number of signal wavelengths (or the number of transmission wavelengths) propagating in the system (transmission lines 110) varies dynamically and, for coping with this variation of the number of wavelengths, an AGC amplifier 120 having an automatic gain control (AGC) function is usually employed for the above-mentioned optical amplification units 102 in order to maintain a constant output light power with respect to each wavelength (keep gain flatness for each wavelength).

In this case, for example, as shown in FIG. 8, the AGC amplifier 120 is composed of an EDFA 121, optical branching units 122 and 123 such as optical couplers for respectively splitting partially input/output lights to/from the EDFA 121, PDs 124 and 125 for respectively monitoring the powers of the branch lights (i.e., input/output light powers of the EDFA 121) split by the optical couplers 122 and 123, and an automatic gain control unit 126 for controlling the excitation light power to the EDFA 121 so that the power ratio monitored by the PDs 124 and 125 becomes constant. The SOFA 121 includes an EDE (not shown) serving as an amplification medium, an excitation light source, and an optical coupling unit for supplying the excitation light of the excitation light source from the former-stage or latter-stage of the EDF.

Meanwhile, in the system shown in FIG. 7, let it be assumed that, for example, as shown in FIG. 9(A), a large number of (for example, 39 wavelengths) optical signals are added from a certain node 100 (100A) and a different one-wavelength optical signal is added from the next node 100 (100B). In such a situation, for example, as shown in FIG. 9(B), in a case in which a dynamic re-construction of an optical transmission path or a trouble such as a man-made mistake, fiber disconnection or fallout of a connector occurs between the nodes 100A and 100B, only the signal light added at the node 100B remains (that is, the number of transmission wavelengths varies abruptly). At this time, for example, as shown in FIG. 10(A), there occurs a phenomenon of a variation of the power level of the residual optical signal at a signal reception end under the node 100 (100C).

In this case, for example, as shown in FIG. 16, the aforesaid "signal reception end" signifies an optical receiver 131 having an optical/electrical conversion (O/E) function to receive a dropped light split at the node 100 (100C in FIG. 9(A)) for converting it into an electric signal, and this also applies to the following description. Moreover, a "signal transmission end" signifies an optical transmitter 132 having an electrical/optical conversion function (E/O) to convert a transmission signal (electric signal) into an optical signal. An optical signal from the optical transmitter 132 is inserted as an added light into a WDM signal light at nodes 100 (100A and 100B in FIG. 8(A)).

For example, as shown in FIG. 10(B), the aforesaid signal light power variation stems mainly from three factors: (1) spectral hole burning (SHB), (2) gain (wavelength) deviation and (3) Stimulated Raman Scattering (SRS) effect. Each of these factors will be described hereinbelow.

(1) SHB

The first factor "SHB" is a physical phenomenon occurring at an optical amplification in an optical amplifier such as the EDFA 121 and shows a feature that the shorter wavelength side optical signal power falls. That is, for example, as shown in FIG. 11, when an optical signal with one wavelength (for example, 1538 nm) in the C band (1530 to 1565 nm) is amplified in the EDFA 121, the possible phenomenon is that the EDFA gain in the vicinity of the signal wavelength drops (which is referred to as main hole) and the EDFA gain in the vicinity of 1530 nm also falls (which is referred to as second hole).

In addition, in the C band, there is a characteristic that the main hole becomes deeper toward the shorter wavelength side (the gain falling degree increases), and the main hole and the second hole become deeper as the optical signal input power increases. This SHB is subjected to the averaging in a state where a multi-wavelength signal light is inputted thereto and the influence thereof is low, whereas the influence thereof increases as the number of inputted wavelengths decreases.

For this reason, for example, as shown in the row (1) of FIG. 10(B) and as shown in FIG. 12(A), in a case in which a trouble has occurred between the nodes 100A and 100B as mentioned above, if a signal light with a wavelength inserted (added) from the node 100A drops out and only a signal light with a wavelength inserted at the node 100B remains (see the time t0 in FIG. 10(A)), there occurs a phenomenon that the gain of the EDFA 121 serving as the back-end optical amplification unit 102b in the node 100B further decreases (−ΔP) in the case of the shorter wavelength side residual signal light, which also causes a reduction of the output light power.

In the example shown in the row (1) of FIG. 10(B), one wavelength λa on the shorter wavelength side (inserted or added at the node 100B) and a longer wavelength band L remain while, when an intermediate wavelength band M positioned on the longer wavelength side with respect to λa (inserted at the node 100A) drops out, the output light power of the shorter wavelength side signal light with the residual wavelength λa decreases by ΔP in comparison with the output light power in the longer wavelength side wavelength band L.

Thus, in a case in which a variation of a waveband amplified by the optical amplification unit 102 occurs, as well known, the influence of the SHB applied to the residual signal after the variation varies according to the number of wavelengths of the residual signal light and the location or arrangement thereof. That is, the fluctuation degree of the gain in the optical amplification unit 102 due to the SHB varies. The detailed description about the SHB exists in detail in the Non-Patent Documents 1 to 3.

(2) Gain Deviation

The second factor "gain (wavelength) deviation" is a phenomenon occurring the optical amplification units 102 (102a, 102b) configured as the AGC amplifier 120. That is, as mentioned above, the optical amplification units 102 are designed to execute control (AGC) for maintaining a constant average gain of signal light and, when a wavelength producing a deviation remains, the optical amplification unit 102 operates so as to adjust the gain of the signal light to a target gain and, for example, as shown in the row (2) of FIG. 10(B), with respect to the residual optical signal, the output light power from the optical amplification unit 102 varies (in this case, +ΔP). That is, in this case, the operating point in the optical amplification unit 102 varies according to the number of signal wavelengths and the location thereof, which causes a variation of the gain spectrum.

Even in a case in which a signal light for each wavelength, which has originally a uniform level, is inputted before the occurrence of a trouble between the nodes 100A and 100B, in the back-end optical amplification unit 102b serving as the AGC amplifier 120 in the node 100B, a WOM signal light having a power distribution shown on the left side in the row (2) is outputted from the EDFA 121 (see FIG. 8) due to a gain wavelength characteristic of the EDFA 121. The example shown in the row (2) of FIG. 10(B) shows a case in which, of the wavelength components of the WOM signal light amplified by the EDFA 121, a wavelength λb having an output power lower than the output power which is an object of the AGC control before the occurrence of a trouble remains at the occurrence of the trouble.

That is, at the execution of the AGC control, when the full wavelength band B (inserted at the node 100A) other than λb drops out due to the trouble occurring between the nodes 100A and 100B while one wavelength λb of the intermediate wavelengths (inserted at the node 100B) remains, in the back-end amplification unit 102b of the node 100B, the target gain (operating point) is increased in the automatic gain control unit 126, and the light power after the amplification of the signal light with the remaining wavelength band λb reaches an light power which is a target of AGC control. Therefore, the signal light with this wavelength λb is increased by ΔP in comparison with the value before the variation of the wavelength location.

(3) SRS Effect

The third factor "SRS effect" is a phenomenon occurring in the transmission lines 110 (see FIG. 7). The Raman amplifier is an optical amplifier utilizing this SRS effect. For example, as shown in FIG. 13, the SRS of a common single mode fiber shows a feature that a gain peak appears on a lower frequency side shifted by approximately 13 THz from the excitation light wavelength (longer wavelength side by approximately 100 nm in a case in which the excitation light wavelength is in the vicinity of 1400 nm), and the optical signal amplification in an arbitrary wavelength band becomes feasible by the selection of an excitation light wavelength. However, as shown in FIG. 13, difficulty is experienced in enabling the amplification of a pinpoint wavelength, and the amplification (gain) characteristic has some degree of spread with respect to wavelength and, hence, the amplification phenomenon occurs even in the vicinity of the excitation light wavelength.

That is, in a case in which a WDM optical signal is transmitted long the transmission lines 110, the shorter wavelength side signal light power becomes the excitation light power, which amplifies the longer wavelength side signal light. In consequence, as shown in FIG. 14, the phenomenon appears that the signal light power increases toward the longer wavelength side. Accordingly, in a case in which only one-wavelength signal light remains due to the occurrence of a trouble between the nodes 100A and 100B as mentioned above, as shown in the row (3) of FIG. 10 and in FIG. 12(B), the longer wavelength side residual signal light encounters a larger difficulty to take the power from the shorter wavelength side, and a power (gain) reduction (−ΔP) occurs. That is, the SRS effect varies according to the number of signal wavelengths and the location thereof.

Thus, if the number of wavelengths of a WDM signal light propagating in the transmission lines 110 varies largely, due to the influence of the SHB, gain deviation and SRS described above, the output light power of the residual signal light (residual channel) varies. In the OADM unit 101, it is possible to place a function to adjust the levels of the signal lights with the respective wavelengths through the use of the feedback control, and this feedback control function can cope with the fluctuation of the output light power stemming from the aforesaid variation of the number of signal light wavelengths and the locations.

However, this respective-wavelengths handling feedback control usually takes a considerable long time from the variation of the number of wavelengths (time t0) up to the steady-state functioning (time t2) as shown in FIG. 10(A). That is, difficulty is actually encountered in suppressing even the transient fluctuation of the output light power during the time t1 in FIG. 10(A) after the variation of the number of wavelengths.

In addition, with respect to such a transient fluctuation of the output light level, although the fluctuation for each node 100 or for each transmission line 110 is not very large, the power fluctuation characteristic of one optical amplification unit 102 increases cumulatively in the case of the system in which similar optical amplification units 102 carrying out the AGC are provided in a multi-stage fashion. For example, as shown in FIG. 15, the negative-side output light power variation (−ΔP) for each channel which occurs at each optical amplification unit 102 and transmission line 110 increases cumulatively due to an increase in number of spans, i.e., an increase in number of stages of the transit optical amplifiers. The example in FIG. 15 shows that the negative-side output power variation increases due to an increase in number of spans.

In the case of a conventional optical transmission system which provides a short transmission distance and which has a small number of stages of the optical amplifiers, this variation is minute and does not create a problem. However, in the future, along with a further increase in the number of stages of optical amplifiers for the long-distance transmission of the system, as shown in FIG. 15, the optical signal power at a signal reception end exceeds a reception allowable range, which can trigger a transmission error. In other words, in a wavelength multiplex optical transmission system which performs a repeating transmission through a plurality of nodes 100 each having an OADM function, there is a possibility that the occurrence of a trouble in one transmission line zone can affect the communication in another transmission line zone.

Furthermore, as techniques related to the invention of the present application, there are the techniques disclosed in the following Patent Documents 1 to 4.

The Patent Documents 1 and 2 disclose that a portion of signal light inputted to an optical amplifier is taken out as monitor light and inputted to a wavelength demultiplexer (DEMUX) for demultiplexing it according to wavelength for counting the number of transmission wavelengths. Concretely, the technique disclosed in the Patent Document 1 is designed to monitor inputted light to an optical amplifier for each wavelength for adjusting the attenuation quantity in a variable optical attenuator provided at an output of the optical amplifier according to the monitor value and a variation of the number of wavelengths, thus controlling the output light power collectively. On the other hand, according to the technique disclosed in the Patent Document 2, in an optical amplifier where optical amplification fibers such as EDFs are connected in a multi-stage fashion, the excitation light power to each optical amplification fiber and the attenuation quantity in a variable optical attenuator provided between the stages of the respective optical amplification fibers are adjusted on the basis of a signal light power detected from input light to the former-stage optical amplification fiber, the number of wavelengths and a signal light power detected from output light of the latter-stage optical amplification fiber, thereby controlling the gain and gain spectrum of the entire optical amplifier.

As techniques for compensating (flattening) for the aforesaid variation (deviation in wavelength characteristic of signal light) of the output from an optical amplifier, there are a dynamic gain equalizer (DGEQ) and the techniques proposed in the following Patent Documents 3 and 4. The technique disclosed in the Patent Document 3 is designed to use an optical circulator, an optical reflector, a variable optical attenuator and a WDM coupler for carrying out the gain equalization for each of a plurality of signal lights (wavelengths) split by the WDM coupler. The technique disclosed in the Patent Document 4 relates to a variable gain flattening device including a plurality of gratings having a long-period structure and an adjustment unit (a piezo converter and a piezo control circuit) for adjusting the attenuation rate for each grating.

[Patent Document 1] Japanese Patent Laid-Open No. 2001-168841

[Patent Document 2] Japanese Patent Laid-Open No. 2003-258348

[Patent Document 3] Japanese Patent Laid-Open No. HEI 10-173597

[Patent Document 4] Japanese Patent Laid-Open No. HEI 11-337750

[Non-Patent Document 1] Masato NISHIHARA, et. al., "Characterization and new numerical model of spectral hole burning in broadband erbium-doped fiber amplifier", 2003 Optical Society of America

[Non-Patent Document 2] Masato NISHIHARA, et. al., "Impact of spectral hole burning in multi-channel amplification of EDFA", 2004 Optical Society of America

[Non-Patent Document 3] Maxim Bolshtyansky, "Spectral Hole Burning in Erbium-Doped Fiber Amplifiers", JOURNAL OF LIGHT WAVE TECHNOLOGY, VOL. 21, NO. 4 APRIL 2003.

However, in the case of the above-mentioned level adjustment function in the OADM unit 101 and the technique disclosed in the Patent Document 3, since the received WDM signal light is demultiplexed according to wavelength and the optical power is adjusted for each wavelength by variable optical attenuator for each wavelength, the apparatus scale becomes larger and the cost becomes higher. In particular, when a VOA which can achieve a high-speed operation is used for obtaining a high-speed response characteristic, this VOA is costly and, if the VOAs equal in number to the wavelengths are prepared, the cost further increases. If a relatively low-cost and low-speed operating VOA is employed from the viewpoint of cost restriction, it is impossible to suppress the above-mentioned transient output light power fluctuation.

In addition, the above-mentioned dynamic gain equalizer creates a problem, for example, in that the response speed stands at approximately 30 ms, the cost is high and reaches several millions yen and the insertion loss is large (approximately 5 dB) and, hence, difficulty is experienced in actually introducing it into the system. The technique disclosed in the aforesaid Patent Document 4 individually changes the characteristics of a plurality of gratings by controlling a piezo converter through the use of a piezo control circuit for changing the pressure to be applied to the grating, thereby enabling a variation of the attenuation rate of light passing through the grating. However, since the pressure change, i.e., physical control, is conducted with respect to the grating, the response speed becomes low as well as the above-mentioned technique.

The techniques disclosed in the Patent Documents 1 and 2 are not made to suppress the transient variation of the gain wavelength characteristic of the EDFA 121 stemming from the above-mentioned variation of the number of wavelengths and then restrain the transient fluctuation of the output light level.

SUMMARY OF THE INVENTION

The present invention has been developed in consideration of the above-mentioned problems, and it is therefore an object of the invention to promptly suppress a fluctuation of signal light level, particularly, a fluctuation of output light power of an optical amplifier stemming from a variation of the number of wavelengths of wavelength-multiplexed signal light.

(1) For this purpose, a gain control apparatus according to the present invention, which controls a gain of an optical amplifier made to amplify wavelength-multiplexed signal light inputted, comprises a target gain calculating unit for calculating a target gain so that a gain (output) of signal light increases or decreases as the number of wavelengths of the wavelength-multiplexed signal light decreases, and a control signal outputting unit for outputting a control signal to the optical amplifier so that the wavelength-multiplexed signal light is amplified with the target gain calculated by the target gain calculating unit.

(2) In addition, in the aforesaid (1), it is also appropriate that a change rate of increase/decrease of a gain (output) of the signal light with respect to the number of signal wavelengths is made to vary sharply and continuously as the number of signal wavelengths decreases.

(3) Furthermore, a gain control apparatus according to the present invention, which controls a gain of an optical amplifier made to amplify wavelength-multiplexed signal light inputted, comprises a target gain calculating unit for calculating, as a target gain for the optical amplifier, a substantially constant gain value in a case in which the number of wavelengths of the wavelength-multiplexed signal light is larger than a threshold set in advance or is equal to or more than the threshold while calculating, as a target gain for the optical amplifier, a value obtained by increasing or decreasing a gain value (output value) of the signal light according to the number of wavelengths in a case in which the number of wavelengths of the wavelength-multiplexed signal light is equal to smaller than the threshold or is less than the threshold, and a control signal outputting unit for outputting a control signal to the optical amplifier so that the wavelength-multiplexed signal light is amplified with the target gain calculated by the target gain calculating unit.

(4) Moreover, in the aforesaid (3), it is also acceptable that the threshold is equal to or smaller than the number of wavelengths corresponding to 25% of a total number of wavelengths transmittable as the wavelength-multiplexed signal light in a wavelength multiplex optical transmission system.

(5) Still moreover, in the aforesaid (1), it is also appropriate that the target gain calculating unit includes a number-of-wavelengths information acquiring unit for acquiring number-of-wavelengths information on the wavelength-multiplexed signal light to be amplified by the optical amplifier, and a calculation unit for calculating the target gain for the amplification by the optical amplifier on the basis of the number-of-wavelengths information acquired by the number-of-wavelengths information acquiring unit.

(6) Yet moreover, in the aforesaid (1), it is also appropriate that the target gain calculating unit has a power monitor for monitoring power of each signal light for each wavelength constituting the wavelength-multiplexed signal light inputted to the optical amplifier or outputted from the optical amplifier and acquires the number-of-wavelengths information on the wavelength-multiplexed signal light on the basis of a result of the monitoring by the power monitor so that calculates the target gain using the number of wavelengths.

(7) In addition, in the aforesaid (1), the gain control apparatus further comprises an inputted light power monitor for monitoring optical power of the wavelength-multiplexed signal light inputted to the optical amplifier and an outputted light power monitor for monitoring optical power of the wavelength-multiplexed signal light outputted from the optical amplifier, wherein the control signal outputting unit outputs a control signal to the optical amplifier so as to carry out automatic gain control on the optical amplifier with the target gain, calculated by the target gain calculating unit, on the basis of monitor results from the inputted light power monitor and the outputted light power monitor.

(8) Furthermore, an optical transmission apparatus according to the present invention comprises a signal light processing unit for processing signal light for each of wavelengths constituting wavelength-multiplexed signal light to be transmitted in a wavelength multiplex optical transmission system, an optical amplifier provided at a former stage and/or latter stage of the signal light processing unit for amplifying the wavelength-multiplexed signal light, inputted thereto, with excitation light, and a gain control unit for controlling a gain of the optical amplifier, and the gain control unit includes a target gain calculating unit for calculating, as a target gain for the optical amplifier, a value obtained by increasing or decreasing a gain (output) of signal light as the number of wavelengths of the wavelength-multiplexed signal light decreases, and a control signal outputting unit for outputting a control signal to the optical amplifier so that the wavelength-multiplexed signal light is amplified with the target gain calculated by the target gain calculating unit.

(9) Still furthermore, in the aforesaid (8), it is also possible that a change rate of increase/decrease of the gain (output) of the signal light with respect to the number of signal wavelengths is made to vary sharply and continuously as the number of signal wavelengths decreases.

(10) In addition, an optical transmission apparatus according to the present invention comprises a signal light processing unit for processing signal light for each of wavelengths constituting wavelength-multiplexed signal light to be transmitted in a wavelength multiplex optical transmission system, an optical amplifier provided at a former stage and/or latter stage of the signal light processing unit for amplifying the wavelength-multiplexed signal light, inputted thereto, with excitation light, and a gain control unit for controlling again of the optical amplifier, and the gain control unit includes a target gain calculating unit for calculating, as a target gain for the optical amplifier, a substantially constant gain value in a case in which the number of wavelengths of the wavelength-multiplexed signal light is larger than a threshold set in advance or is equal to or more than the threshold while calculating, as a target gain for the optical amplifier, a value obtained by increasing or decreasing a gain value (output value) with respect to the constant gain value according to the number of wavelengths in a case in which in a case in which the number of wavelengths of the wavelength-multiplexed signal light is equal to smaller than the threshold or is less than the threshold, and a control signal outputting unit for outputting a control signal to the optical amplifier so that the wavelength-multiplexed signal light is amplified with the target gain calculated by the target gain calculating unit.

(11) Still additionally, in the aforesaid (8), it is also appropriate that the signal light processing unit is made to individually carry out the power adjustment on the signal light for each of the wavelengths, and the control signal outputting unit outputs the control signal to the optical amplifier for controlling the optical power of the wavelength-multiplexed signal light to be transmitted, in cooperation with an operation for the power adjustment in the signal light processing unit.

(12) Yet additionally, in the aforesaid (8), it is also possible that the signal light processing unit conducts add- or drop-processing on the wavelength-multiplexed signal light to be transmitted, for each wavelength.

(13) Moreover, in the aforesaid (8), it is also appropriate that the optical amplifier includes an amplification medium and an excitation light supplying unit for supplying excitation light to the amplification medium for exciting the amplification medium.

(14) Furthermore, a gain control method for an optical amplifier according to the present invention, which is for controlling an amplification gain of the optical amplifier made to amplify wavelength-multiplexed signal light, inputted, with excitation light, comprises the steps of calculating a target gain (output) of the signal light for the optical amplifier so that the gain increases or decreases as the number of wavelengths of the wavelength-multiplexed signal light decreases and outputting a control signal to the optical amplifier so that the wavelength-multiplexed signal light is amplified with the calculated target gain.

(15) Still moreover, in the aforesaid (14), it is also appropriate that a change rate of increase/decrease of the gain (output) of the signal light with respect to the number of signal wavelengths is made to vary sharply and continuously as the number of signal wavelengths decreases.

(16) Furthermore, a gain control method for an optical amplifier according to the present invention, which is for controlling an amplification gain of the optical amplifier made to amplify wavelength-multiplexed signal light, inputted, with excitation light, comprises the steps of calculating a target gain for the optical amplifier so that the gain becomes a constant value in a case in which the number of wavelengths of the wavelength-multiplexed signal light is larger than a threshold set in advance or is equal to or more than the threshold while the gain increases or decreases with respect to the constant value according to the number of wavelengths in a case in which the number of wavelengths of the wavelength-multiplexed signal light is equal to smaller than the threshold or is less than the threshold, and outputting a control signal to the optical amplifier so that the wavelength-multiplexed signal light is amplified with the calculated target gain.

(17) In addition, in the aforesaid (16), it is also appropriate that, in a case in which the number of wavelengths is equal to smaller than the threshold or is less than the threshold, when the output light power of the wavelength-multiplexed signal light outputted from the optical amplifier is lower than a predetermined output light power, a value obtain by increasing the gain value with respect to the constant gain value according to the number of wavelengths is calculated as the target gain while, when the output light power of the wavelength-multiplexed signal light outputted from the optical amplifier is higher than the predetermined output light power, a value obtain by decreasing the gain value with respect to the constant gain value according to the number of wavelengths is calculated as the target gain.

(18) Still additionally, in the aforesaid (16), it is also acceptable that the threshold is equal to or smaller than the number of wavelengths corresponding to 25% of a total number of wavelengths transmittable as the wavelength-multiplexed signal light in a wavelength multiplex optical transmission system.

(19) Yet additionally, in the aforesaid (14), it is also acceptable that, at the calculation of the target gain, number-of-wavelengths information on the wavelength-multiplexed signal light is acquired so as to calculate the target gain on the basis of the number-of-wavelengths information acquired.

(20) Furthermore, a wavelength multiplex optical transmission system according to the present invention is configured by connecting the optical transmission apparatus in the aforesaid (8) through an optical transmission line.

As described above, according to the present invention, the target gain calculating unit is capable of promptly suppressing the fluctuation of the signal light level, particularly, the fluctuation of the output light power of the optical amplifier stemming from a variation of the number of wavelengths of wavelength-multiplexed signal light, which enables further multi-stage configuration of optical amplifiers and achieves longer transmission distance.

BRIEF DESCRIPTION OF THE DRAWINGS

FIGS. 3(A) to 3(C) are illustrations for explaining an operation according to this embodiment in comparison with a conventional technique.

FIGS. 10(A) and 10(B) are illustrations for explaining a fluctuation of output light power at a variation of the number of wavelengths stemming from the occurrence of a trouble in the system shown in FIG. 7;

DESCRIPTION OF THE PREFERRED EMBODIMENTS

An embodiment of the present invention will be described hereinbelow with reference to the drawings.

The present invention is not limited to the following embodiment. Moreover, the above-mentioned object of the invention of the subject application, other technical objects, means for achieving this technical objects and advantages thereof will clearly appear from the disclosure of the following embodiment.

[A] Description of Embodiment of the Present Invention

Figure 1:
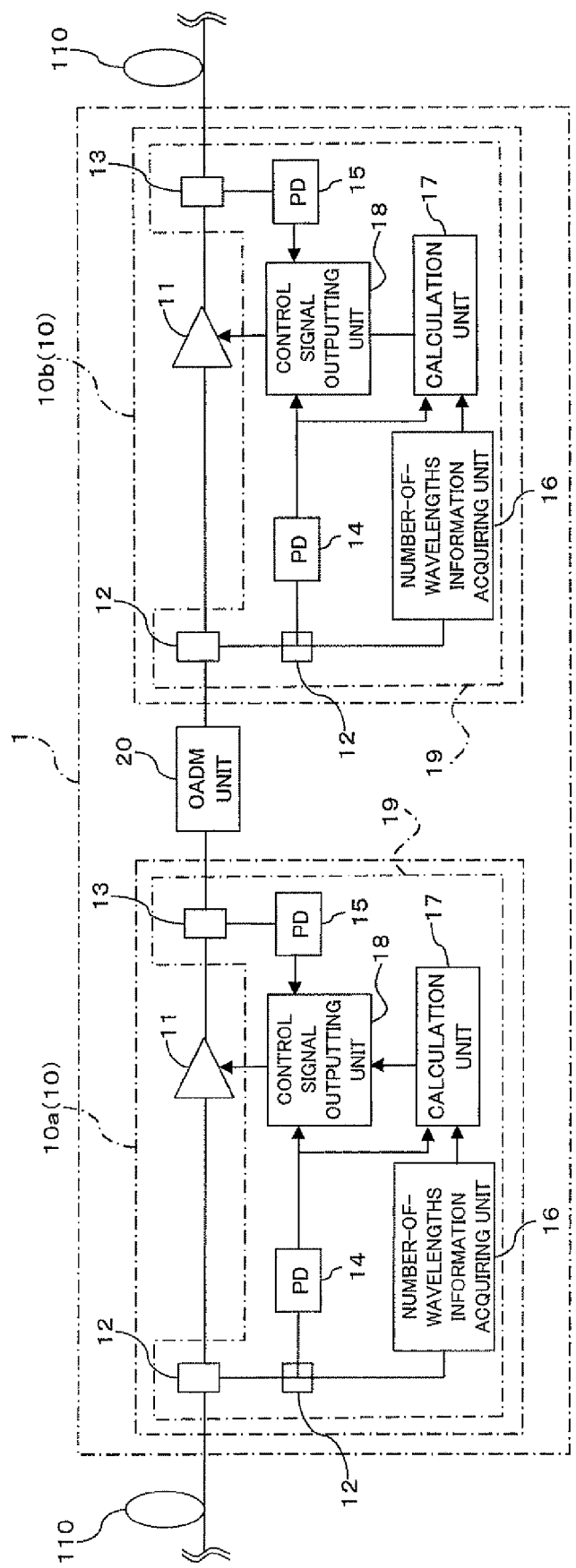
FIG. 1 is an illustration of a wavelength multiplex optical transmission system.

FIG. 1 shows an optical transmission apparatus 1 to be applied to a wavelength multiplex optical transmission system according to an embodiment of the present invention. In this embodiment, in place of the above-mentioned OADM node 100 shown in FIG. 7, an optical transmission apparatus 1 is connected with other optical transmission apparatus 1 through optical transmission lines 110 into a ring-like configuration, thereby constructing a wavelength multiplex optical transmission system. The difference of the optical transmission apparatus 1 according to this embodiment from the above-mentioned optical transmission apparatus 100 shown in FIG. 7 (see FIG. 8) is the configurations of front-end (pre-) and back-end (post-) optical amplification units 10a and 10b.

Figure 7:
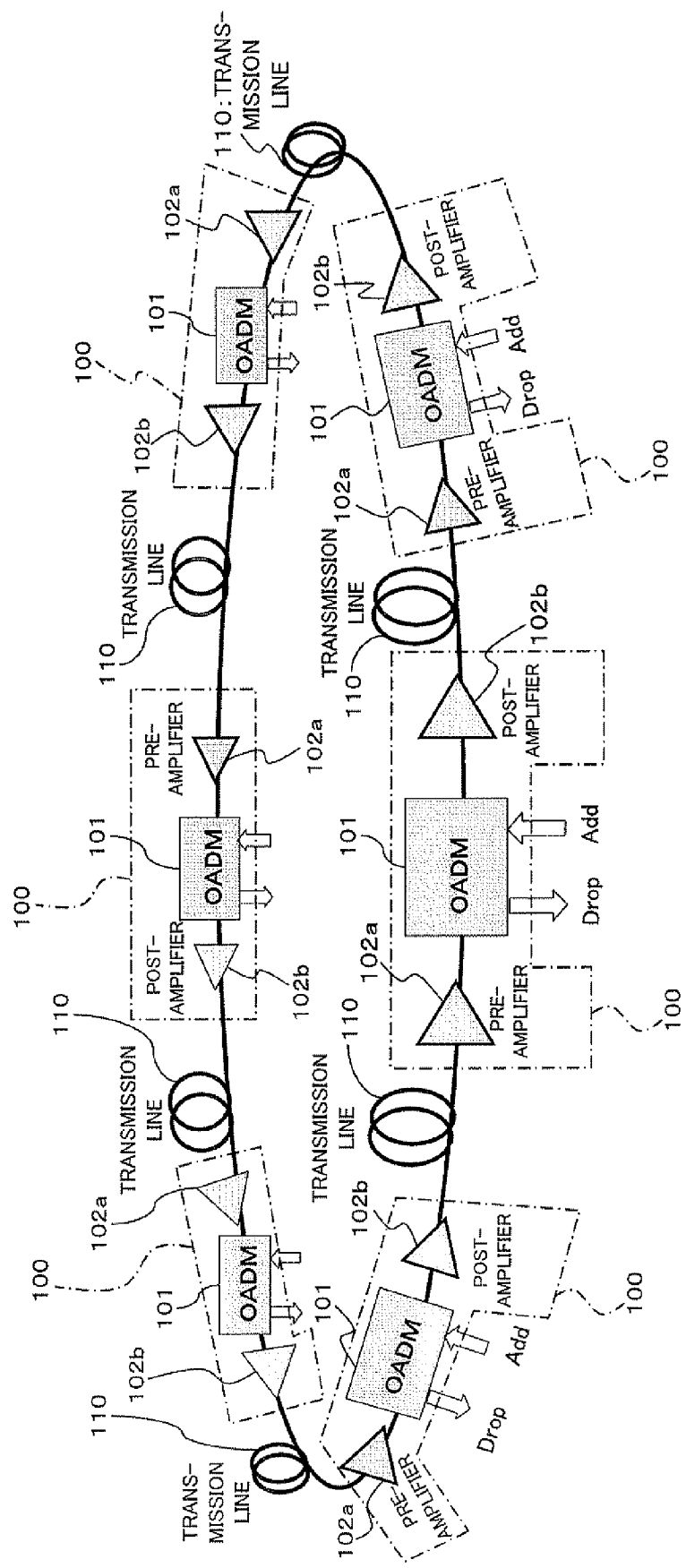
FIG. 7 is a block diagram showing an example of a configuration of a metrocore system.
Figure 8:
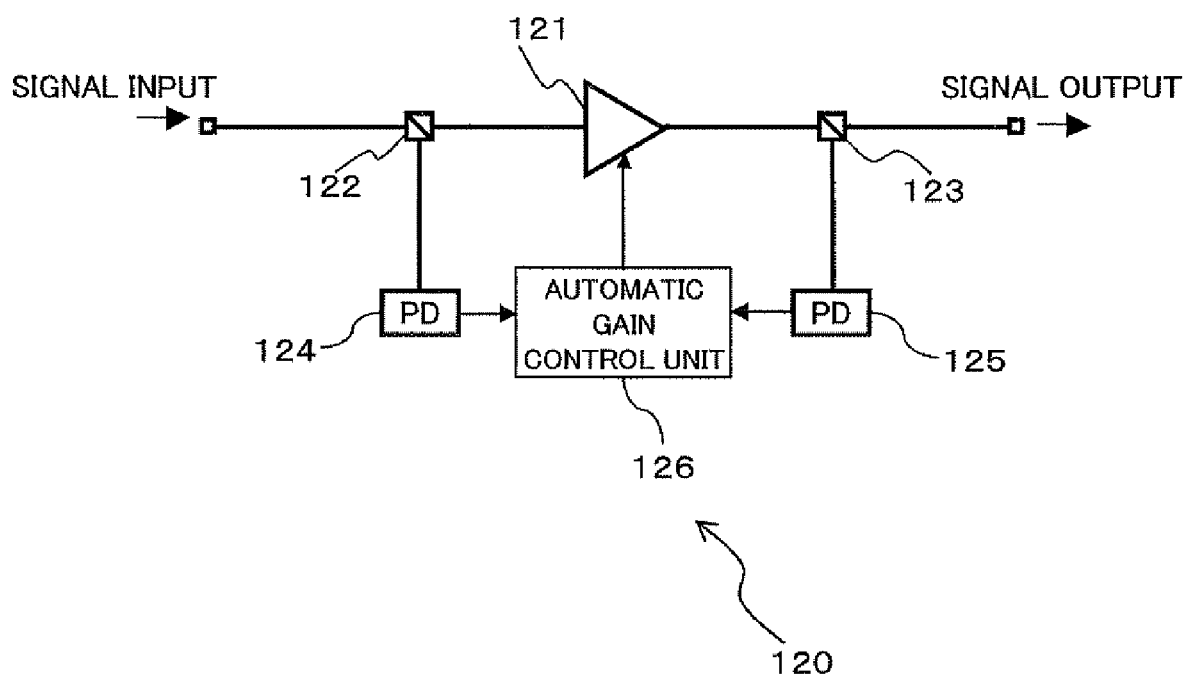
FIG. 8 is a block diagram showing an example of a configuration of a conventional AGC amplifier.

That is, the optical transmission apparatus 1 according to this embodiment has front-end and back-end optical amplification units 10a and 10b each having a configuration different from the above-mentioned units (designated at reference numerals 102a, 102b, 120) shown in FIG. 7 (FIG. 8), and it includes an OADM unit 20 basically similar to the above-mentioned unit (denoted at reference numeral 101) shown in FIG. 7.

In this configuration, the front-end optical amplification unit (optical amplification apparatus) 10a serving as a preamplifier amplifies wavelength-multiplexed signal light inputted from the upstream side optical transmission apparatus 1 (not shown in FIG. 1), connected thereto, through the optical transmission line 110 and outputs the amplified wavelength-multiplexed signal light to the OADM unit 20. The OADM unit 20 conducts the add/drop processing on the wavelength-multiplexed signal light from the front-end optical amplification unit 10a and outputs the wavelength-multiplexed signal light, which is to be sent to the downstream side optical transmission line 110, to the back-end amplification unit 10b. Moreover, the back-end amplification unit (optical amplification apparatus) 10b acting as a post amplifier amplifies the wavelength-multiplexed signal light, subjected to the add/drop processing in the OADM unit 20, and outputs the amplified wavelength-multiplexed signal light to the downstream side optical transmission line 110.

Therefore, the aforesaid OADM unit 20 serves as a signal light processing unit for conducting the processing on the signal light for each wavelength constituting the wavelength-multiplexed signal light to be transmitted in a wavelength multiplex optical transmission system. Moreover, as well as the above-mentioned unit (see reference numeral 101) shown in FIG. 7, this OADM unit 20 has not only a function to carry out the add/drop processing but also a function to carry out the level adjustment in units of channels.

Figures 9A, 9B:
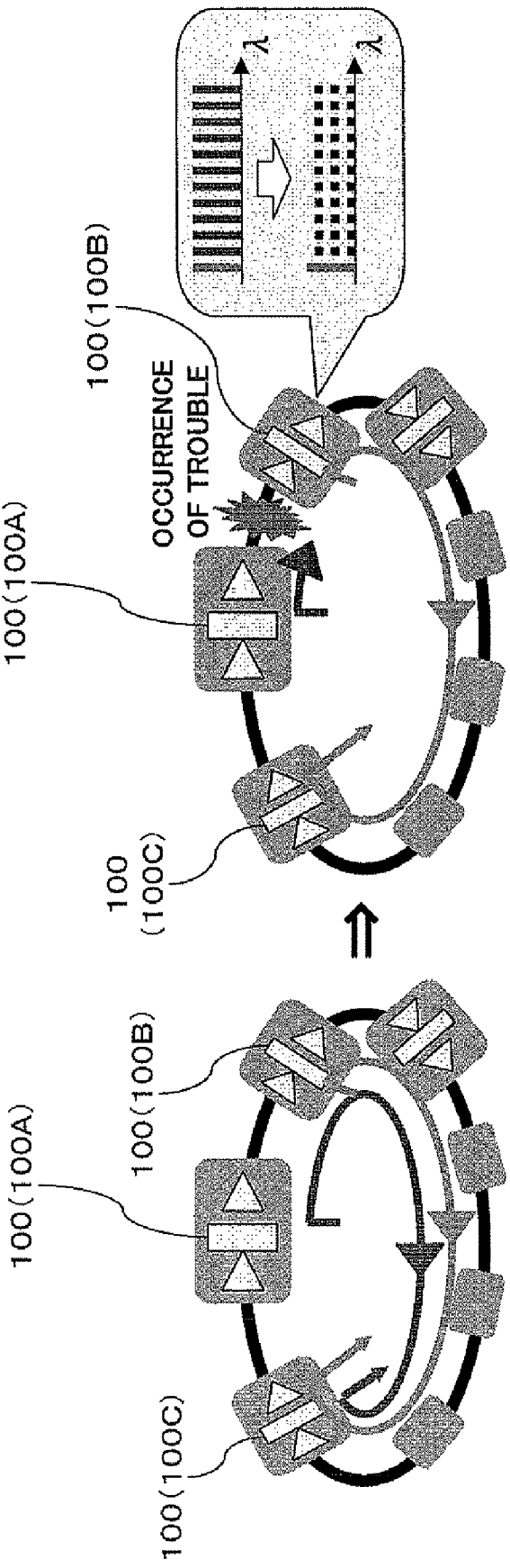
FIGS. 9(A) and 9(B) are illustrations for explaining an operation at the occurrence of a trouble in the system shown in FIG. 7.
Figure 11:
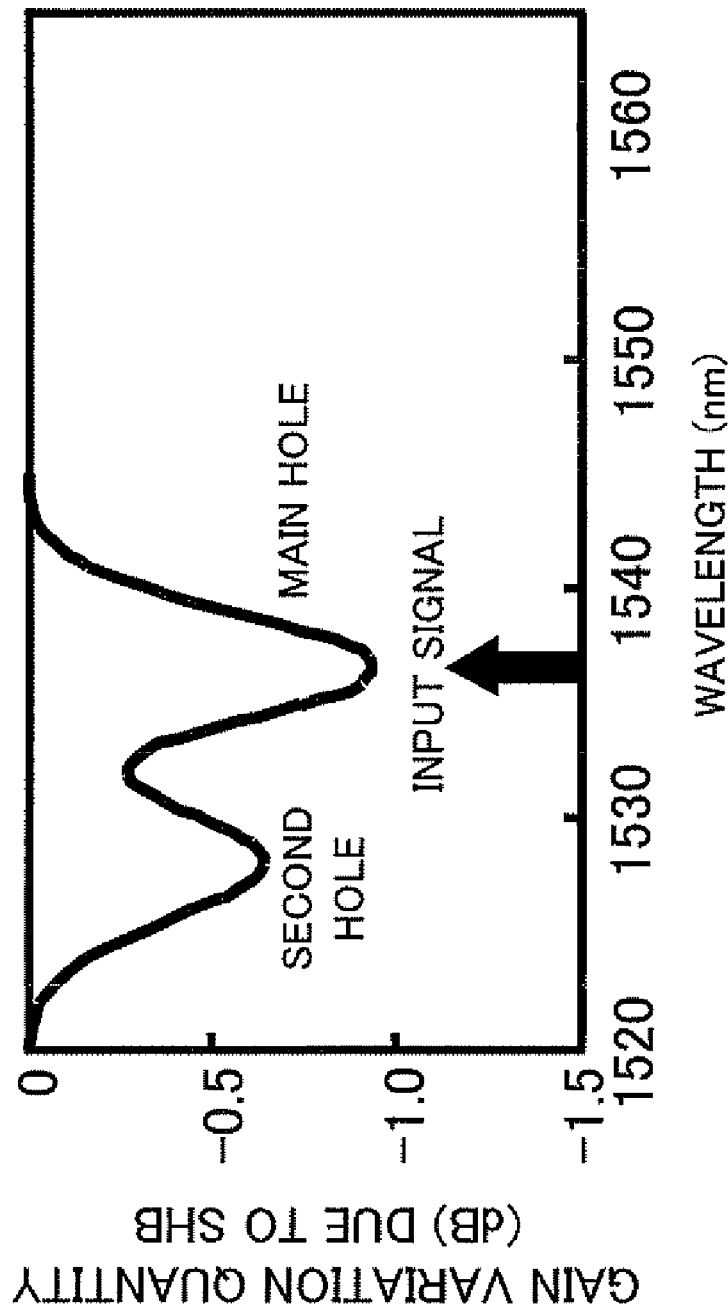
FIG. 11 is an illustration of one example of a gain variation quantity depending upon wavelengths due to the SHB.
Figure 12A:
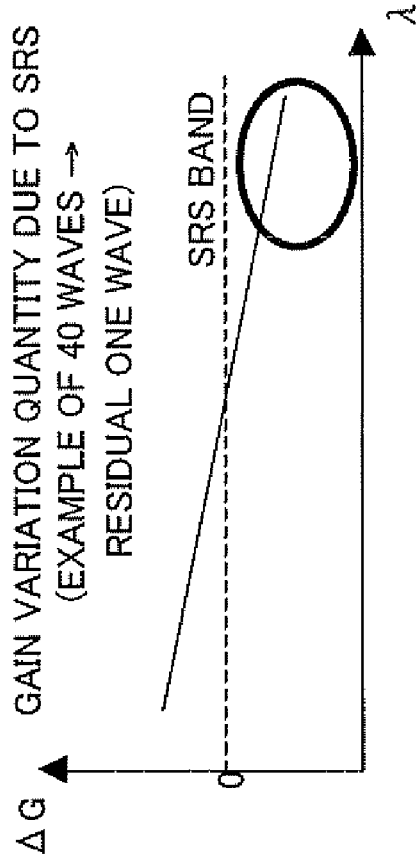
FIG. 12(A) is an illustration of one example of a gain variation quantity stemming from the SHB with respect to wavelengths.
Figure 12B:
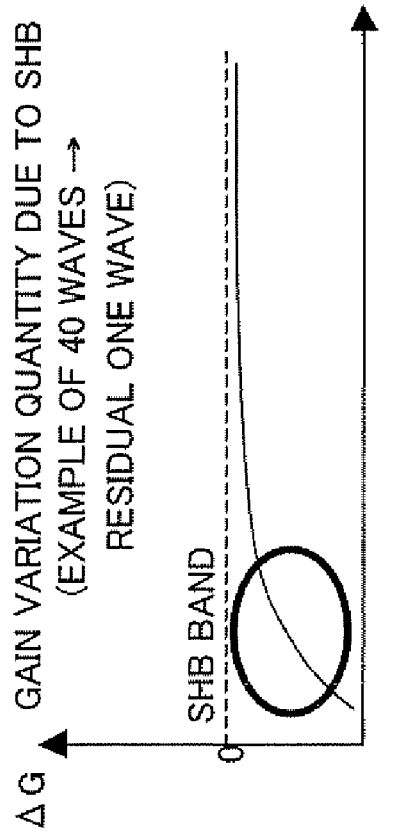
FIG. 12(B) is an illustration of one example of a gain variation quantity stemming from the SRS with respect to wavelengths.
Figure 13:
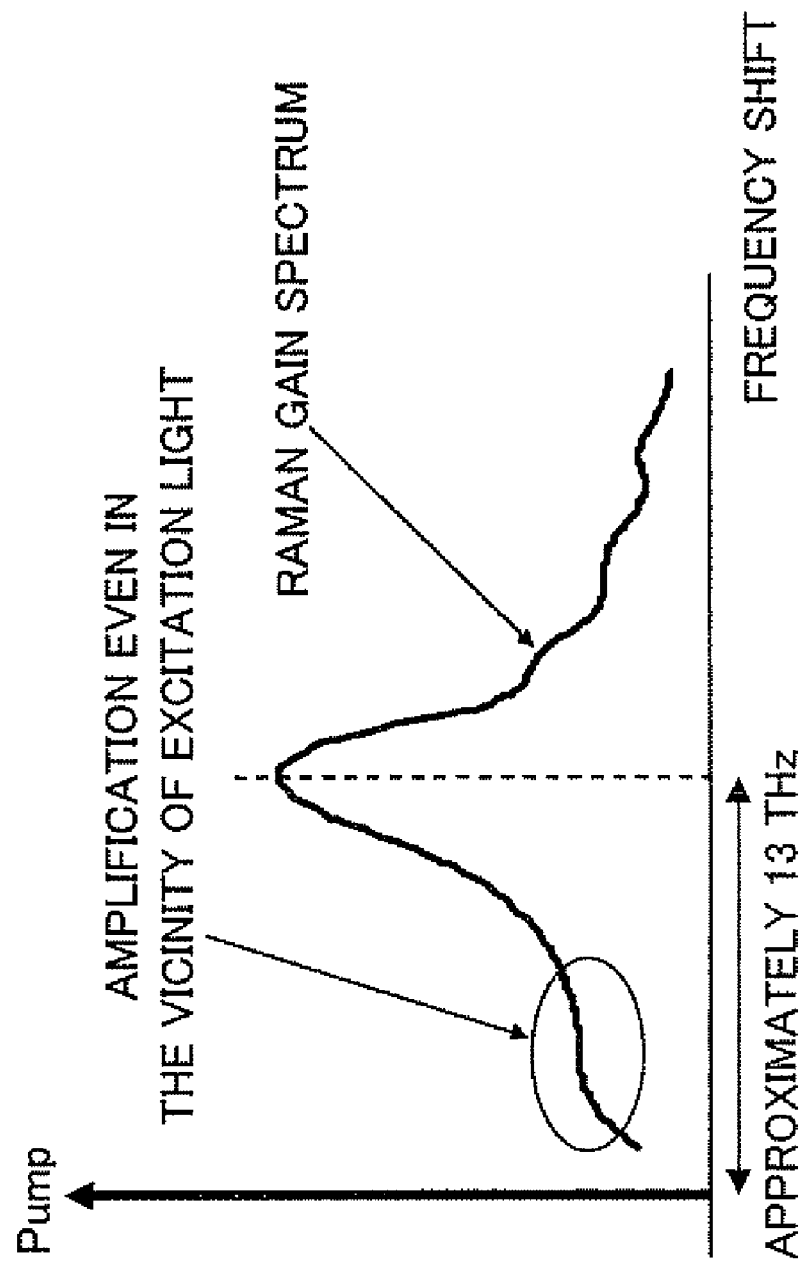
FIG. 13 is an illustration of one example of a Raman amplification waveband.
Figure 14:
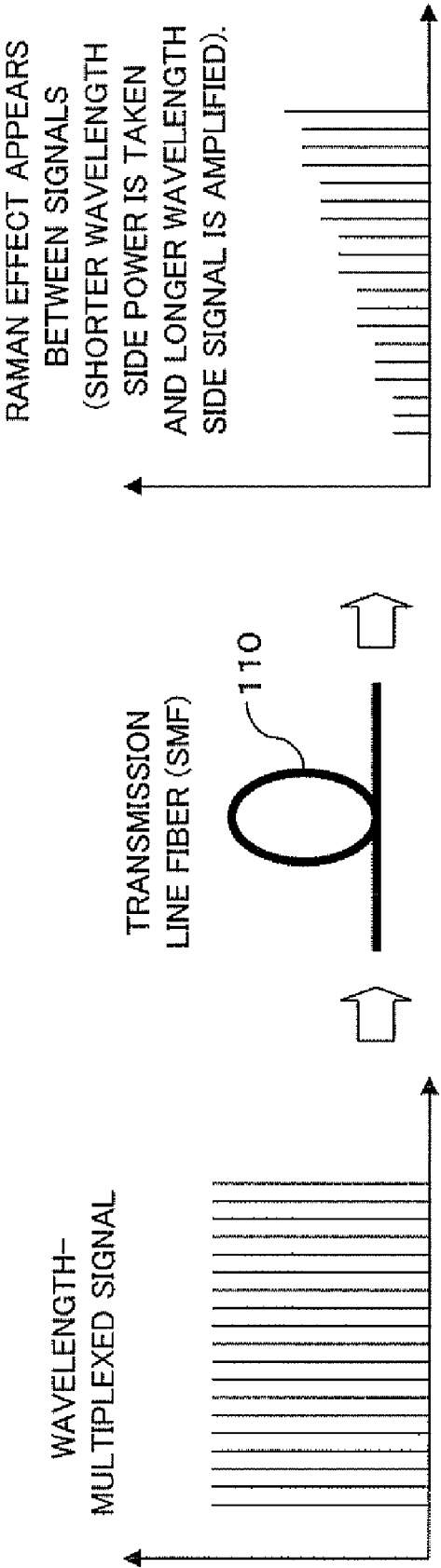
FIG. 14 is an illustration for explaining the Raman effect between signal wavelengths.
Figure 15:
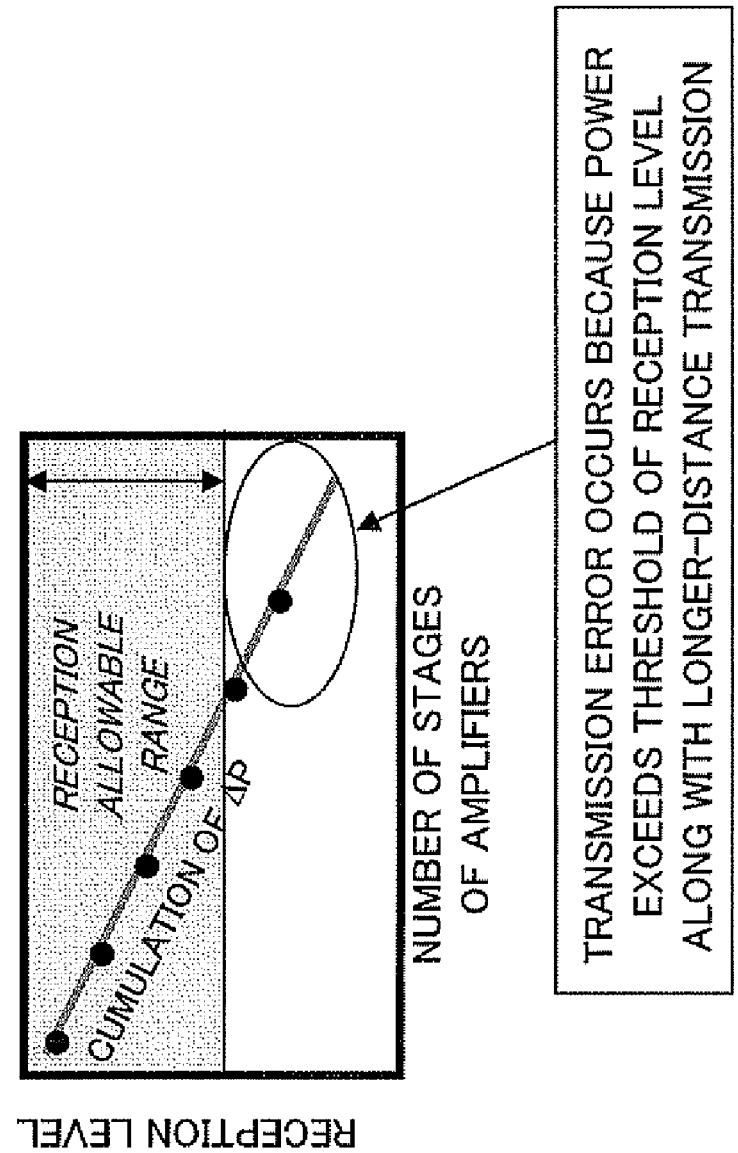
FIG. 15 is an illustration for explaining problems of a conventional technique.

The aforesaid front-end optical amplification unit 10a and back-end optical amplification unit 10b have configurations similar to each other, which can suppress the fluctuation of the output light power stemming from a variation of the number of wavelengths of signal light due to the occurrence of a trouble as shown in FIG. 9(B). In this configuration, each of these front-end optical amplification unit 10a and back-end optical amplification unit 10b includes an EDFA 11 functioning as an optical amplifier to amplify optically inputted wavelength-multiplexed signal light with excitation light and further includes a gain control unit (gain control apparatus) 19 made to control the gain of the EDFA 11. In the following description, in the case of no discrimination, the front-end optical amplification unit 10a and the back-end optical amplification unit 10b will be referred to simply as an optical amplification unit 10.

The gain control unit 19 is composed of optical couplers 12 and 13, photodiodes 14 and 15, a number-of-wavelengths information acquiring unit 16, a calculation unit 17 and a control signal outputting unit 18. As mentioned above, the EDFA 11 is for amplifying the inputted wavelength-multiplexed signal light with excitation light and is composed of an EDF serving as an amplification medium (not shown), an excitation light source and an optical multiplexer unit for supplying excitation light of the excitation light source from the upstream side (former stage) or downstream side (latter stage) in the signal light transmission direction of the EDF. Moreover, the optical couplers 12 and 13 correspond to the optical couplers 122 and 123 shown in FIG. 8, respectively, and they are for partially splitting (branching) the wavelength-multiplexed signal light inputted to the optical amplification unit 10 and outputted therefrom.

The photodiode 14 is for outputting an electric signal corresponding to the optical power of the wavelength-multiplexed signal light inputted through the optical coupler 12 and, owing to this photodiode 14, it is possible to monitor the optical power of the wavelength-multiplexed signal light inputted to the EDFA 11 (before the amplification in the EDFA 11). Likewise, the photodiode 15 is for outputting an electric signal corresponding to the optical power of the wavelength-multiplexed signal light inputted through the optical coupler 13 and this photodiode 14 enables monitoring the optical power of the wavelength-multiplexed signal light outputted from the EDFA 11 (after the amplification in the EDFA 11).

The number-of-wavelengths information acquiring unit 16 is for acquiring a number-of-wavelengths information on the wavelength-multiplexed signal light to be amplified in the EDFA 11. Concretely, a split light of the wavelength-multiplexed signal light to be inputted to the EDFA 11 is demultiplexed at wavelength intervals corresponding to channels to be wavelength-multiplexed so as to monitor each demultiplexed light, thereby counting the number of wavelengths. A configuration for the acquisition the number of wavelengths in the number-of-wavelengths information acquiring unit 16 is also disclosed in the aforesaid Patent Document 1 and others.

Incidentally, in the number-of-wavelengths information acquiring unit 16, although the number-of-wavelengths information is acquired from a split light of the wavelength-multiplexed signal light to be inputted to the EDFA 11, likewise, it is also possible that the number-of-wavelengths information is acquired from the wavelength-multiplexed signal light outputted from the EDFA 11. Moreover, it is also acceptable to acquire the number-of-wavelengths information from a signal light monitoring function for each channel, which is provided in the OADM unit 20. In this case, the number-of-wavelengths information acquiring unit 16 of the front-end optical amplifier 10a can receive a result of the monitoring on the signal light for each channel in the wavelength-multiplexed signal light to be inputted to the OADM unit 20 (at the former stage of the add/drop processing) to acquire the number-of-wavelengths information. Still moreover, the number-of-wavelengths information acquiring unit 16 of the back-end optical amplifier 10b can receive a result of the monitoring on the signal light for each channel in the wavelength-multiplexed signal light outputted from the OADM unit 20 (after the add/drop processing) to acquire the number-of-wavelengths information.

Although several examples have been described above, the means for obtaining the number-of-wavelengths information is not limited in the present invention.

Figure 2A:
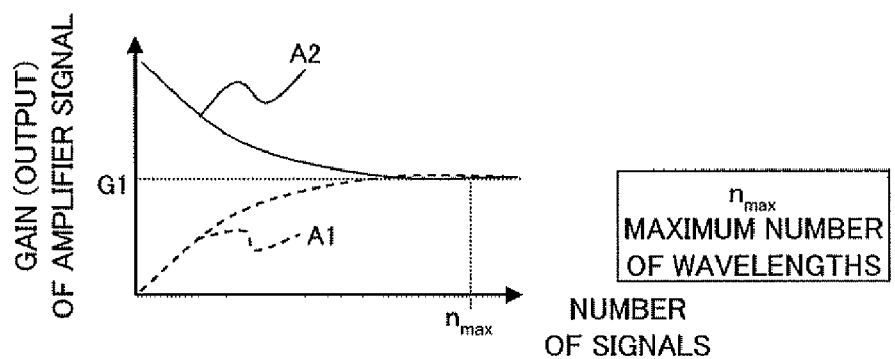
FIGS. 2(A) to 2(D) are illustrations for explaining a target gain of an EDFA according to an embodiment of the present invention.

Moreover, the calculation unit 17 is made to obtain, from the photodiode 14, the result of the monitoring on the optical power of the wavelength-multiplexed signal light to be inputted to the EDFA 11 and calculate a target gain corresponding to the number of wavelengths, which is to be amplified in the EDFA 11, on the basis of the number-of-wavelengths information acquired by the number-of-wavelengths information acquiring unit 16. Concretely, as shown in FIG. 2(A), the calculation unit 17 is made to calculate, as a target gain of the EDFA 11, a value which increases (see a dotted line A1 in FIG. 2(A)) or decreases (see a solid line A2 in FIG. 2(A)) according to the number of wavelengths of the wavelength-multiplexed signal light so that the gain of the signal light varies exponentially and continuously according to the number of wavelengths from a constant (settled) gain value G1 at a maximum number of wavelengths.

Figure 2B:
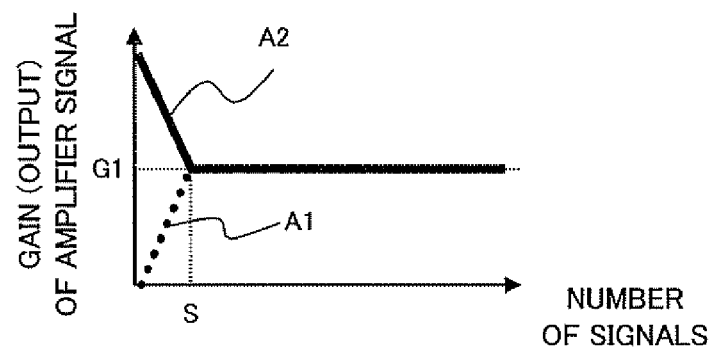
Figure 2C:
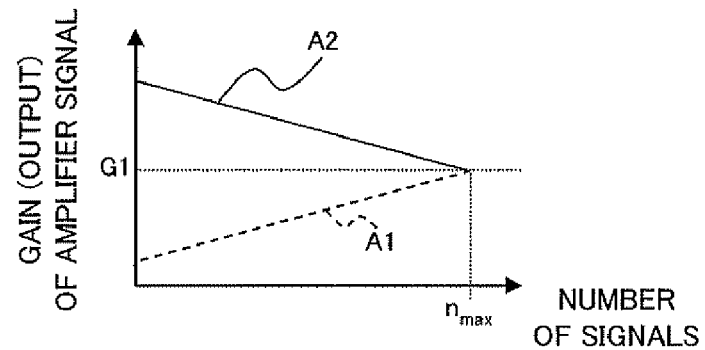
Figure 2D:
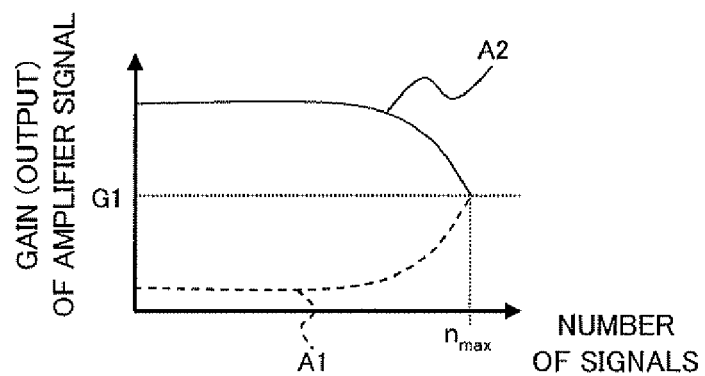

Still moreover, as shown in FIG. 2(B), in a case in which the number of wavelengths of the wavelength-multiplexed signal light is larger than or equal to or more than a threshold S set in advance, the substantially constant gain value G1 is calculated as the target gain of the EDFA 11. On the other hand, when the number of wavelengths of the wavelength-multiplexed signal light is equal to or lower than or smaller than the threshold S, a value obtained by increasing (see a dotted line A1 in FIG. 2(B)) or decreasing (see a solid line A2 in FIG. 2(B)) the gain value according to the number of wavelengths is calculated as the target gain of the EDFA 11.

Therefore, the above-mentioned the number-of-wavelengths information acquiring unit 16 and the calculation unit 17 constitute a target gain calculating unit.

The above-mentioned threshold S can be set at a value equal to or smaller than approximately 25% of a total number of wavelengths transmittable as wavelength-multiplexed signal light in a wavelength multiplex optical transmission system.

The control signal outputting unit 18 is for outputting a control signal to the EDFA 11 so that the gain reaches the target gain calculated by the calculation unit 17. In this connection, the control signal outputting unit 18 in this embodiment can also carry out the automatic gain control (AGC control) on the EDFA 11 and, in this case, it receives a gain, which is a target of the automatic gain control, from the calculation unit 17.

For the aforesaid AGC control, the control signal outputting unit 18 receives, from the photodiode 14, the monitor result on the optical power of the wavelength-multiplexed signal light to be inputted to the EDFA 11 and receives, from the photodiode 15, the monitor result on the optical power of the wavelength-multiplexed signal light outputted from the EDFA 11, and outputs a control signal to drive the excitation light source (not shown) in the EDFA 11 so that the input/output power rate in the EDFA 11, which is an amplification gain on the wavelength-multiplexed signal light in the EDFA 11, is set as a value calculated by the calculation unit 17.

Since the AGC control is implemented with the target gain calculated by the aforesaid calculation unit 17, in a case in which transmitted is the wavelength-multiplexed signal light comprising channels which are equal to or smaller than 25% of a total number of channels multiplex-allowable in a wavelength multiplex optical transmission system (in the case of a relatively small number of wavelengths), in comparison with a case in which transmitted is wavelength-multiplexed signal light comprising channels larger in number than approximately 25% (in the case of a relatively large number of wavelengths) it is possible to enhance the output light power of the signal light outputted from the EDFA 11 (see the upper section in FIG. 3(C)) or reduce the output light power of the signal light outputted from the EDFA 11 (see the lower section in FIG. 3(C)).

Figure 3A:
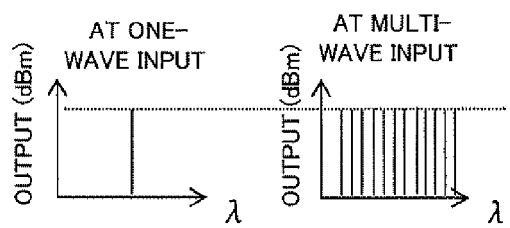

In a conventional technique, at the AGC control on the gain of an EDFA, as shown in the "conventional" row of FIG. 3(A), regardless of the number of wavelengths of wavelength-multiplexed signal light (even in the case of a relatively small number of wavelengths or a relatively large number of wavelengths, as mentioned above), the gain to be applied to the EDFA 11 is made to become constant. Accordingly, excepting the influence of the above-mentioned SHB, gain deviation and SRS from consideration, as shown in FIG. 3(B), the gain is set so that the output power also becomes constant. Japanese Patent Laid-Open (Kokai) No. 2000-232433 discloses the control on an EDFA in like manner.

However, as mentioned above, in recent years, because the enhanced need for an increase in the number of spans and a lengthening in transmission distance, for providing a configuration of an optical amplification apparatus which copes with this requirement, there is a need to consider the aforesaid SHB, gain deviation and SRS. For this reason, in this embodiment, in the aforesaid case of a relatively large number of wavelengths, the substantially constant gain value G1 is calculated as a target gain of the EDFA 11. On the other hand, in the aforesaid case of a relatively small number of wavelengths, a value obtained by increasing (see the dotted line A1 in FIGS. 2(A) and 2(B)) or decreasing (see the solid line A2 in FIGS. 2(A) and 2(B)) the gain value (output) of the signal light according to the number of wavelengths is calculated as the target gain of the EDFA 11.

The magnitude of the influence each of the SHB, gain deviation and SRS in the case of a small number of wavelengths applies to the fluctuation of the output light power of the EDFA 11 constituting the optical transmission apparatus 1 also varies according to the characteristics, the actual optical transmission apparatus configuration and others in the wavelength multiplex optical transmission system. Accordingly, it is preferable to previously grasp the characteristic of the fluctuation of the output light power in the case of a small number of wavelengths on the basis of the configuration of the optical transmission apparatus 1 employed as the optical amplification unit 10, the characteristic of the employed wavelength multiplex optical transmission system and others.

In addition, for example, with respect to the characteristics of a receiver used in the system, if the SN proof strength/input lower limit proof strength is low, it is preferable that the control is executed in a direction of increasing the gain (output) of the signal light. On the other hand, the input upper limit proof strength is low, it is preferable that the control is executed in a direction of decreasing the gain (output) of the signal light.

Thus, on the basis of the grasped characteristic of the output light power fluctuation in the case of a small number of wavelengths, it is possible that, as shown in the upper section of FIG. 3(C), the calculation unit 17 is designed so as to obtain, as a calculation result, a value which increases the target gain value according to the number of wavelengths, or that, as shown in the lower section of FIG. 3(C), the calculation unit 17 is designed so as to obtain, as a calculation result, a value which decreases the target gain value according to the number of wavelengths.

The optical transmission apparatus 1 thus configured in a wavelength multiplex optical transmission system amplifies the wavelength-multiplexed signal light inputted through the upstream side optical transmission line 110 and, in the OADM unit 20, adds/drops the signal light for each channel with respect to the wavelength-multiplexed signal light inputted from the front-end amplification unit 10a and transmits it to the downstream side optical transmission line 110 after the amplification in the back-end amplification unit 10b.

At this time, in the front-end amplification unit 10a and back-end amplification unit 10b constituting the optical transmission apparatus 1, the possible output light power fluctuation depending on the number of wavelengths of the wavelength-multiplexed signal light inputted (particularly, remarkable in the case of a relatively small number of wavelengths) is suppressed through the gain control based on the target gain calculated by the calculation unit 17, as described hereinafter.

Figure 4:
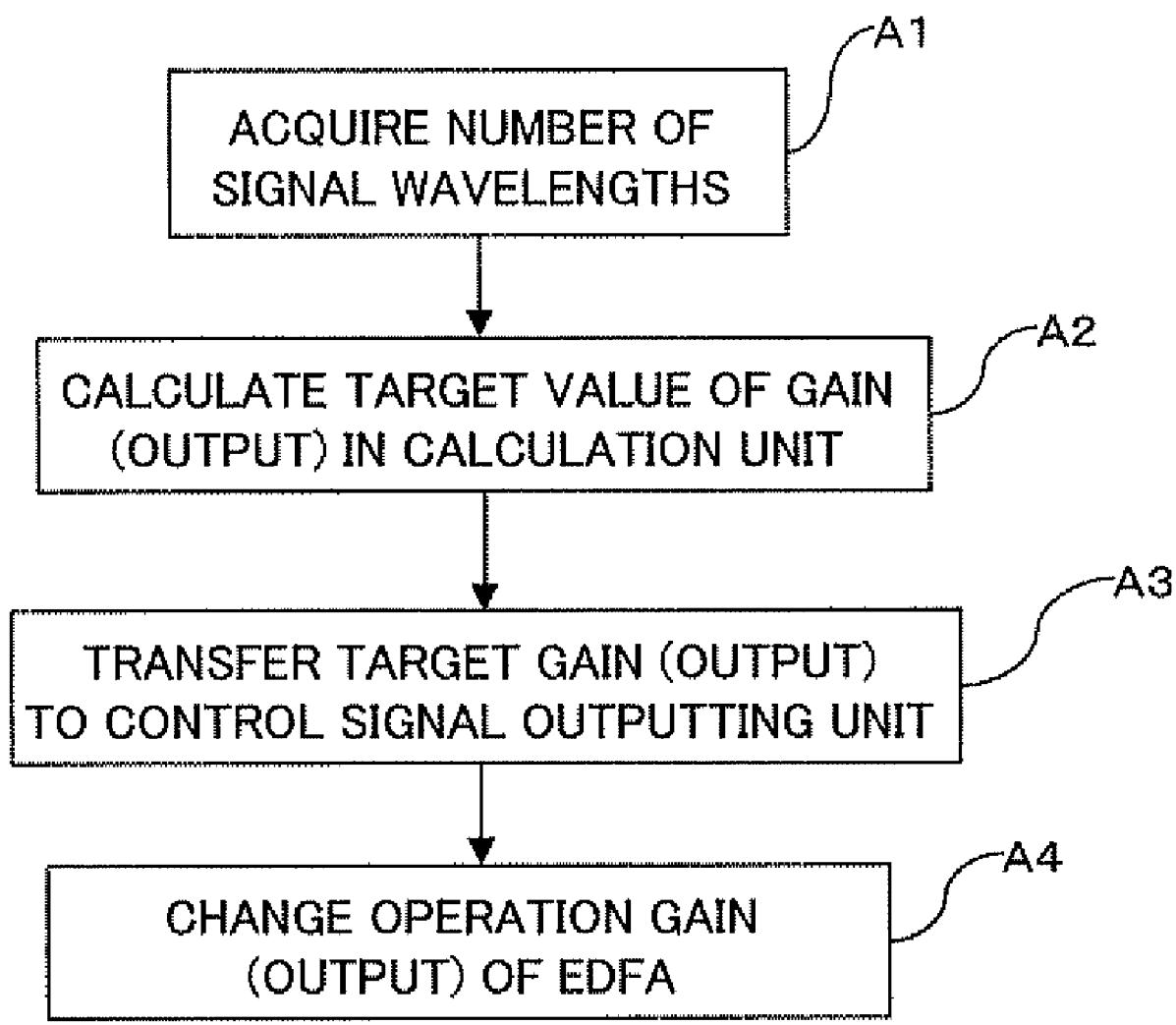
FIG. 4 is a flow chart for explaining an operation according to an embodiment of the present invention.

That is, the number-of-wavelengths information acquiring unit 16 constituting the gain control unit 19 of the optical amplification unit 10 acquires the number-of-wavelengths information on the wavelength-multiplexed signal light to be amplified by the EDFA 11, and the calculation unit 17 takes, from the photodiode 14, a result of the monitoring on the power of the wavelength-multiplexed signal light to be inputted to the EDFA 11 (step A1 in FIG. 4).

Explaining with reference to FIG. 2(B), the calculation unit 17 calculates a target gain (or a target output power corresponding to the target gain) at the amplification in the EDFA 11 on the basis of the number-of-wavelengths information acquired by the number-of-wavelengths information acquiring unit 16 (step A2). At this time, in a case in which the number of wavelengths acquired as the information by the number-of-wavelengths information acquiring unit 16 is larger than the aforesaid threshold S shown in FIG. 2(B) or equal to or more than the threshold S, the calculation unit 17 calculates the substantially constant gain value G1 as a target gain. In the case of the number of wavelengths equal to or smaller than the aforesaid threshold S shown in FIG. 2(B) or lower than the threshold S, the calculation unit 17 calculates, as a target gain, a value which increases or decreases the gain (output) of the signal light in the EDFA 11 as the number of wavelengths decreases.

In addition, the calculation unit 17 sends the target gain value calculated in this way to the control signal outputting unit 18 (step A3), and the control signal outputting unit 18 outputs a control signal to the EDFA 11 so that the EDFA 11 operates at the target gain calculated by the calculation unit 17. In a case in which the number of wavelengths is in variation, the control signal outputting unit 18 outputs a control signal to the EDFA 11 so as to change the gain of the EDFA 11 to the target gain corresponding to the number of wavelengths (step A4) Since the control signal outputting unit 18 according to this embodiment is made to carry out the AGC control, the target gain calculated by the calculation unit 17 becomes a target of the AGC control.

For example, as shown in FIG. 9(B), in a case in which a trouble has occurred at an upstream side portion with respect to this optical transmission apparatus 1 (see reference numeral 100B in FIG. 9(B)) (the upstream side optical transmission line 110 or the upstream side optical transmission apparatus 1 (see reference numeral 100A in FIG. 9(B)), the wavelength-multiplexed signal light transmitted from the upstream side optical transmission apparatus 1 drops out, which causes a variation of the number of wavelengths of the wavelength-multiplexed signal light inputted to this optical transmission apparatus 1.

Figure 5:
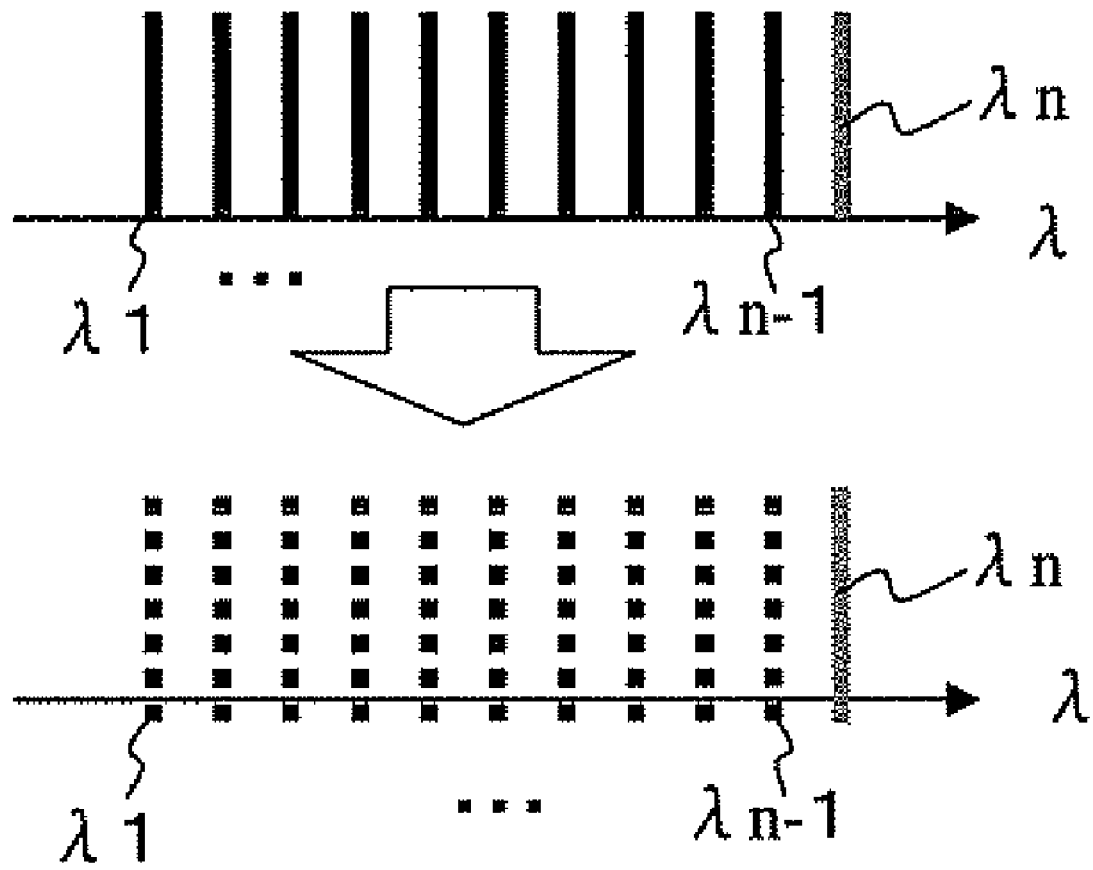
FIG. 5 is an illustration of a concrete example of a variation of the number of wavelengths.

Concretely, as shown in FIG. 5, in this optical transmission apparatus 1, in an operating state where signal light with a wavelength of $\lambda n$ is added to wavelength-multiplexed signal light with wavelengths $\lambda 1$ to $\lambda n-1$ from an upstream side optical transmission apparatus (see the upper section in FIG. 4), if a trouble occurs at an upstream side portion with respect to this optical transmission apparatus 1 as mentioned above, the wavelength-multiplexed signal light with the wavelengths $\lambda 1$ to $\lambda n-1$ from this upstream side optical transmission apparatus falls into an input cutoff condition (see the lower section in FIG. 4).

In the optical amplification unit 10 according to this embodiment, in a case in which a variation in the number of wavelengths has occurred, when the number-of-wavelengths information acquiring unit 16 acquires the number of wavelengths after the variation, the gain of the EDFA 11 is promptly controlled according to the acquired number of wavelengths, which enables the fluctuation of the output light power of the signal light occurring due to the variation of number of wavelengths so far to be suppressed promptly.

As mentioned above, although the level adjustment function in units of channels in the OADM unit 20 also can conduct the follow-up to the output level fluctuation at a variation of the number of wavelengths (see t2 in FIG. 10(A)), in the case of carrying out this level adjustment function by itself, a transient time during which substantial difficulty is encountered in accomplishing the follow-up exists (see t1 in FIG. 10(A)). Since the optical transmission apparatus 1 according to this embodiment not only fulfills the level adjustment function in the OADM unit 20 but also executes the gain control in the optical amplification unit 10, these operations can suppress the power fluctuation in cooperation with each other.

Therefore, even within the time t1 during which difficulty is encountered in accomplishing the follow-up by means of only the level adjustment function in the OADM unit 20, it is possible to suppress the fluctuation of the output light level in the optical amplification unit 10 as mentioned above, thereby enabling the influence of the above-mentioned SHB and others on the output light power to be minimized even in a case in which, particularly, the number of wavelengths greatly varies in the optical transmission apparatus 1.

Figure 6:
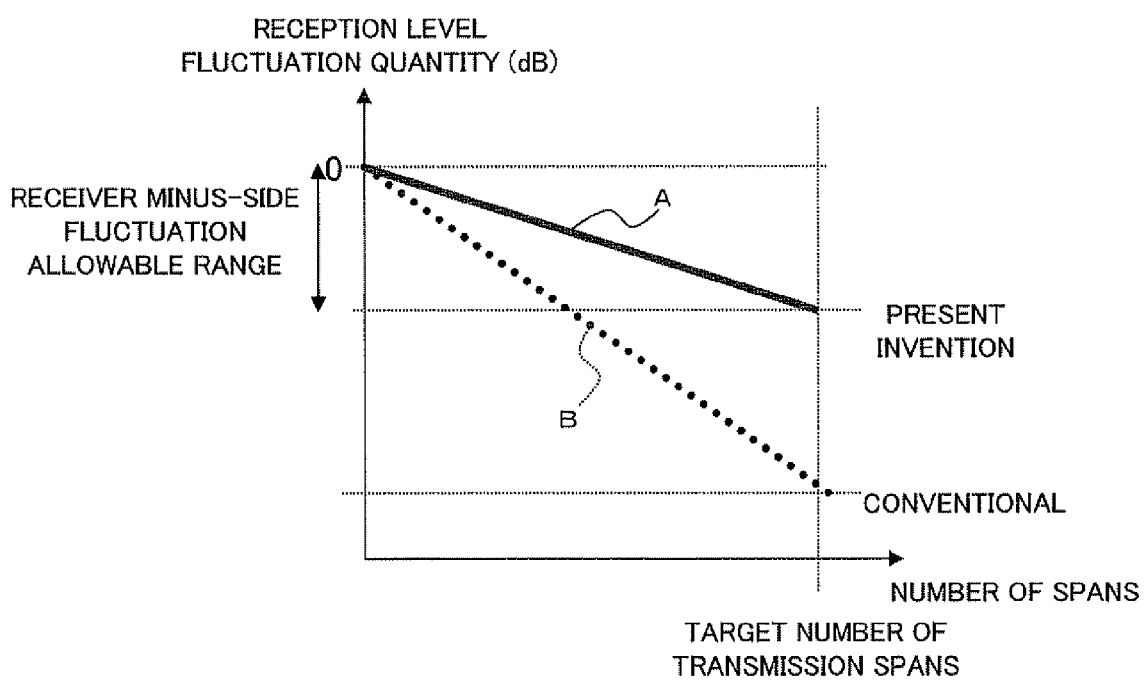
FIG. 6 is an illustration for explaining advantages/effects of an embodiment of the present invention.
Figure 16:
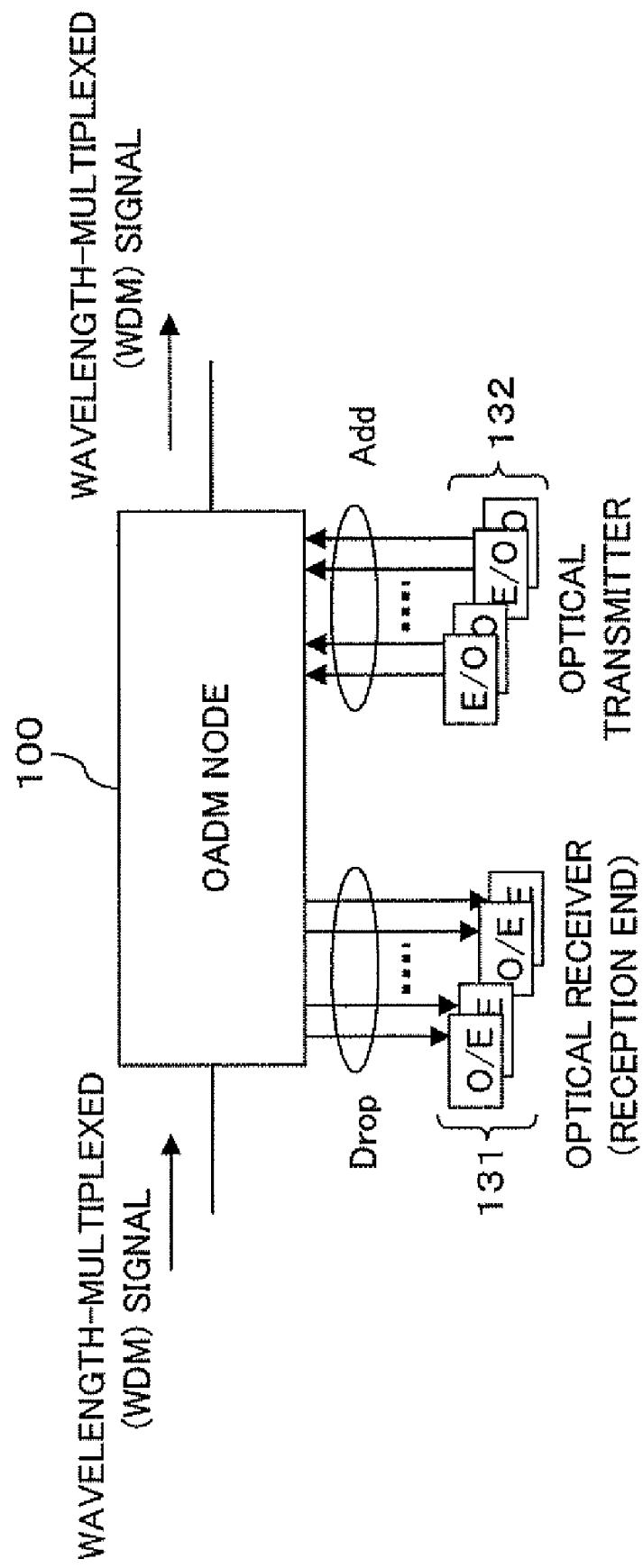
FIG. 16 is a block diagram for explaining a signal reception end.

Moreover, in a case in which optical transmission apparatus according to a conventional technique are connected in a multi-stage fashion to provide the number of spans for accomplishing the purpose, there is a possibility that an optical level fluctuation quantity of signal light for the transmission of this number of spans (in this case, a fluctuation quantity toward the reduction side) becomes out of a reception allowable range at the signal reception end (see reference numeral 131 in FIG. 16), for example, as indicated by B in FIG. 6. However, when the optical transmission apparatus according to this embodiment are connected so as to provide the number of spans for accomplishing the purpose, since an output light power fluctuation for each optical amplification unit 10 is further suppressible in comparison with an optical amplification unit based on a conventional technique, the optical level fluctuation quantity can be kept within a reception allowable range at the signal reception end (see reference numeral 131 in FIG. 16), for example, as indicated by A in FIG. 6.

Thus, according to an embodiment of the present invention, the number-of-wavelengths information acquiring unit 16 and the calculation unit 17, which function as a target gain calculating unit, can promptly suppress the fluctuation of the signal light level, particularly, the fluctuation of the output light power of the optical amplifier stemming from a variation of the number of wavelengths of wavelength-multiplexed signal light, which enables further multi-stage configuration of optical amplifiers and achieves longer transmission distance.

[B] Others

It should be understood that the present invention is not limited to the above-described embodiment, and that it is intended to cover all changes and modifications of the embodiment of the invention herein which do not constitute departures from the spirit and scope of the invention.

For example, although in the above-described embodiment a target gain subjected to the automatic gain control in the control signal outputting unit 18 is set as a target gain calculated by the calculation unit 17, according to the present invention, it is also possible that the control signal outputting unit 18 outputs a control signal to the EDFA 11 so as to set it as a target gain under the AGC control calculated by the calculation unit 17 even in a control mode which is not premised on the AGC control.

In addition, although in the above-described embodiment an EDFA employing an Erbium-doped fiber (EDF) as an amplification medium is used as an optical amplifier, the present invention allows the employment of an optical amplifier with a different configuration.

Still additionally, although in this embodiment both the front-end amplification unit 10a and the back-end amplification unit 10b are provided in the optical transmission apparatus 1, it is also acceptable that at least one of these amplification units is configured as the optical amplification unit 10 according to this embodiment.

Yet additionally, although in the above-described embodiment the number-of-wavelengths information is acquired by the number-of-wavelengths information acquiring unit 16, according to the present invention, for the calculation of a target gain, without acquiring the number-of-wavelengths information by the number-of-wavelengths information acquiring unit 16, it is also appropriate to use a function so that, in a case in which the number of wavelengths of the inputted wavelength-multiplexed signal light is larger than a threshold S or equal to or more than the threshold S, a substantially constant gain value is calculated as a target gain for the optical amplifier while, in a case in which the number of wavelengths of the inputted wavelength-multiplexed signal light is equal to or smaller than the threshold S or lower than the threshold S, a value obtained by increasing or decreasing a gain value of signal light according to the number of wavelengths is calculated as a target gain for the optical amplifier.

Although it is preferable that the present invention is applied to an individual optical amplifier located for each node and a compensation for each node is made with respect to an output fluctuation occurring in each nodes the present invention is not limited to the number of optical amplifiers and the types thereof.

The disclosure of the above-described embodiment enables a person skilled in the art to manufacture the apparatus according to the present invention.

What is claimed is:

1. A gain control apparatus which controls a gain of an optical amplifier made to amplify a wavelength-multiplexed signal light including a plurality of signal lights at different wavelengths that are wavelength division multiplexed, comprising:
    a target gain calculating unit
        to calculate, as a target gain for said optical amplifier, a substantially constant gain value in a case in which the number of signal lights at different wavelengths that are wavelength division multiplexed in the wavelength-multiplexed signal light is larger than a threshold set in advance, and
        to calculate, as a target gain for said optical amplifier, and based on characteristics of said optical amplifier, a value obtained by one of:
            increasing a gain value of the wavelength-multiplexed signal light according to the number of signal lights at different wavelengths that are wavelength division multiplexed together in the wavelength-multiplexed signal light in a case in which the number of signal lights at different wavelengths that are wavelength division multiplexed in the wavelength-multiplexed signal light is less than the threshold, and
            decreasing a gain value of the wavelength-multiplexed signal light according to the number of signal lights at different wavelengths that are wavelength division multiplexed together in the wavelength-multiplexed signal light in the case in which the number of signal lights at different wavelengths that are wavelength division multiplexed in the wavelength-multiplexed signal light is less than the threshold; and
    a control signal outputting unit to output a control signal to said optical amplifier so that the wavelength-multiplexed signal light is amplified with the target gain calculated by said target gain calculating unit, wherein said target gain calculating unit includes
        a number-of-wavelengths information acquiring unit to demultiplex the wavelength-multiplexed signal light inputted to said optical amplifier or outputted from said optical amplifier into the plurality of signal lights at different wavelengths, to monitor a power of each of the demultiplexed plurality of signal lights at different wavelengths and, based on the monitored power, to acquire the number of signal lights at different wavelengths that are wavelength division multiplexed in the wavelength-multiplexed signal light, and
        a calculation unit to calculate the target gain based on the number of signal lights at different wavelengths that are wavelength division multiplexed in the wavelength-multiplexed signal light acquired by said number-of-wavelengths information acquiring unit,
    wherein the threshold is equal to or smaller than a number of signal lights at different wavelengths corresponding to 25% of a total number of signal lights at different wavelengths transmittable in the wavelength-multiplexed signal light in a wavelength multiplex optical transmission system.

2. The gain control apparatus according to claim 1, further comprising:
    an inputted light power monitor to monitor optical power of the wavelength-multiplexed signal light inputted to said optical amplifier, and
    an outputted light power monitor to monitor optical power of the wavelength-multiplexed signal light outputted from said optical amplifier,
    wherein said control signal outputting unit outputs a control signal to said optical amplifier so as to carry out automatic gain control on said optical amplifier with the target gain, calculated by said target gain calculating unit, on the basis of monitor results from said inputted light power monitor and said outputted light power monitor.

3. A gain control apparatus according to claim 1, wherein the characteristics of said optical amplifier on which the calculation of the target gain is based include fluctuation of output light power of said optical amplifier due to at least one of spectral hole burning (SHB), gain deviation and Stimulated Raman Scattering (SRS).

4. An optical transmission apparatus comprising:
    a signal light processing unit to process a plurality of signal lights at different wavelengths that are wavelength division multiplexed in a wavelength-multiplexed signal light to be transmitted in a wavelength multiplex optical transmission system;
    an optical amplifier provided at least one of a former stage and a latter stage of said signal light processing unit to amplify the wavelength-multiplexed signal light with excitation light; and
    a gain control unit to control a gain of said optical amplifier, said gain control unit including:
        a target gain calculating unit to calculate, as a target gain for said optical amplifier and based on characteristics of said optical amplifier, a value obtained by one of:
            increasing a gain of the wavelength-multiplexed signal light as the number of signal lights that are wavelength division multiplexed in the wavelength-multiplexed signal light decreases, and
            decreasing a gain of the wavelength-multiplexed signal light as the number of signal lights that are wavelength division multiplexed in the wavelength-multiplexed signal light decreases; and a control signal outputting unit to output a control signal to said optical amplifier so that the wavelength-multiplexed signal light is amplified with the target gain calculated by said target gain calculating unit, wherein said target gain calculating unit includes a number-of-wavelengths information acquiring unit to demultiplex the wavelength-multiplexed signal light inputted to said optical amplifier or outputted from said optical amplifier into the plurality of signal lights at different wavelengths, to monitor a power of each of the demultiplexed plurality of signal lights at different wavelengths and, based on the monitored power, to acquire the number of signal lights at different wavelengths that are wavelength division multiplexed in the wavelength-multiplexed signal light, and a calculation unit to calculate the target gain based on the number of signal lights at different wavelengths that are wavelength division multiplexed in the wavelength-multiplexed signal light acquired by said number-of-wavelengths information acquiring unit, said signal light processing unit is made to individually carry out power adjustment on each of the plurality of signal lights at different wavelengths, and said control signal outputting unit outputs the control signal to said optical amplifier for controlling optical power of the wavelength-multiplexed signal light to be transmitted, in cooperation with an operation for a power adjustment in said signal light processing unit.

5. The optical transmission apparatus according to claim 4, wherein said signal light processing unit conducts add- or drop-processing on the wavelength-multiplexed signal light to be transmitted, for each of the plurality of signal lights at different wavelengths.

6. The optical transmission apparatus according to claim 4, wherein said optical amplifier includes an amplification medium and an excitation light supplying unit to supply excitation light to said amplification medium for exciting said amplification medium.

7. A wavelength multiplex optical transmission system is configured by connecting the optical transmission apparatus according to claim 4 through an optical transmission line.

8. An optical transmission apparatus comprising:

a signal light processing unit to process a plurality of signal lights at different wavelengths that are wavelength division multiplexed in a wavelength-multiplexed signal light to be transmitted in a wavelength multiplex optical transmission system;

an optical amplifier provided at least one of a former stage and a latter stage of said signal light processing unit to amplify the wavelength-multiplexed signal light with excitation light; and a gain control unit to control a gain of said optical amplifier, said gain control unit including:

a target gain calculating unit to calculate, as a target gain for said optical amplifier, a substantially constant gain value in a case in which the number of signal lights at different wavelengths that are wavelength division multiplexed in the wavelength-multiplexed signal light is larger than a threshold set in advance, and to calculate, as a target gain for said optical amplifier and based on characteristics of said optical amplifier, a value obtained by one of:

increasing a gain value with respect to the constant gain value according to the number of signal lights at different wavelengths that are wavelength division multiplexed in the wavelength-multiplexed signal light in a case in which the number of signal lights at different wavelengths that are wavelength division multiplexed in the wavelength-multiplexed signal light is less than the threshold, and decreasing a gain value with respect to the constant gain value according to the number of signal lights at different wavelengths that are wavelength division multiplexed in the wavelength-multiplexed signal light in the case in which the number of signal lights at different wavelengths that are wavelength division multiplexed in the wavelength-multiplexed signal light is less than the threshold; and a control signal outputting unit to output a control signal to said optical amplifier so that the wavelength-multiplexed signal light is amplified with the target gain calculated by said target gain calculating unit, wherein said target gain calculating unit includes a number-of-wavelengths information acquiring unit to demultiplex the wavelength-multiplexed signal light inputted to said optical amplifier or outputted from said optical amplifier into the plurality of signal lights at different wavelengths, to monitor a power of each of the demultiplexed plurality of signal lights at different wavelengths and, based on the monitored power, to acquire the number of signal lights at different wavelengths that are wavelength division multiplexed in the wavelength-multiplexed signal light, and a calculation unit to calculate the target gain based on the number of signal lights at different wavelengths that are wavelength division multiplexed in the wavelength-multiplexed signal light acquired by said number-of-wavelengths information acquiring unit, said signal light processing unit is made to individually carry out power adjustment on each of the plurality of signal lights at different wavelengths, and said control signal outputting unit outputs the control signal to said optical amplifier for controlling optical power of the wavelength-multiplexed signal light to be transmitted, in cooperation with an operation for a power adjustment in said signal light processing unit.

9. A gain control method for an optical amplifier, which controls an amplification gain of said optical amplifier made to amplify, with excitation light, a wavelength-multiplexed signal light including a plurality of signal lights at different wavelengths that are wavelength division multiplexed, the method comprising:

calculating a target gain for said optical amplifier, based on characteristics of said optical amplifier, so that the gain becomes a constant value in a case in which the number of signal lights at different wavelengths that are wavelength division multiplexed in the wavelength-multiplexed signal light is larger than a threshold set in advance and so that one of the following conditions is satisfied:

the gain increases with respect to the constant value according to the number of signal lights at different wavelengths that are wavelength division multiplexed in the wavelength-multiplexed signal light in a case in which the number of signal lights at different wavelengths that are wavelength division multiplexed in the wavelength-multiplexed signal light is smaller than the threshold, and the gain decreases with respect to the constant value according to the number of signal lights at different wavelengths that are wavelength division multiplexed in the wavelength-multiplexed signal light in the case in which the number of signal lights at different wavelengths that are wavelength division multiplexed in the wavelength-multiplexed signal light is smaller than the threshold, and outputting a control signal to said optical amplifier so that the wavelength-multiplexed signal light is amplified by the optical amplifier with the calculated target gain, wherein said calculating includes
demultiplexing the wavelength-multiplexed signal light inputted to said optical amplifier or outputted from said optical amplifier into the plurality of signal lights at different wavelengths,
monitoring a power of each of the demultiplexed plurality of signal lights at different wavelengths,
acquiring, based on the monitored power, the number of signal lights at different wavelengths that are wavelength division multiplexed in the wavelength-multiplexed signal light, and
calculating the target gain based on the acquired number of signal lights at different wavelengths that are wavelength division multiplexed in the wavelength-multiplexed signal light, and
the threshold is equal to or smaller than a number of signal lights at different wavelengths corresponding to 25% of a total number of signal lights at different wavelengths transmittable in the wavelength-multiplexed signal light in a wavelength multiplex optical transmission system.

10. The gain control method for an optical amplifier according to claim 9, wherein, in a case in which the number of signal lights at different wavelengths that are wavelength division multiplexed in the wavelength-multiplexed signal light is smaller than the threshold, when output light power of the wavelength-multiplexed signal light outputted from said optical amplifier is lower than a predetermined output light power, a value obtain by increasing the gain value with respect to the constant gain value according to the number of signal lights at different wavelengths that are wavelength division multiplexed in the wavelength-multiplexed signal light is calculated as the target gain, and, when the output light power of the wavelength-multiplexed signal light outputted from said optical amplifier is higher than the predetermined output light power, a value obtain by decreasing the gain value with respect to the constant gain value according to the number of signal lights at different wavelengths that are wavelength division multiplexed in the wavelength-multiplexed signal light is calculated as the target gain.

11. An apparatus to amplify a wavelength-multiplexed signal light including a plurality of signal lights at different wavelengths that are wavelength division multiplexed, the apparatus comprising:

a demultiplexer to demultiplex the wavelength-multiplexed signal light into the plurality of signal lights at different wavelengths;
a monitor to monitor a power of each of the demultiplexed plurality of signal lights at different wavelengths;
an acquiring unit to acquire, based on the monitored power, the number of signal lights at different wavelengths that are wavelength division multiplexed in the wavelength-multiplexed signal light;
a calculating unit to calculate a target gain based on the acquired number of signal lights at different wavelengths that are wavelength division multiplexed in the wavelength-multiplexed signal light, the calculating unit calculating the target gain so that,
when the acquired number of signal lights at different wavelengths that are wavelength division multiplexed in the wavelength-multiplexed signal light is larger than a threshold set in advance, the calculated target gain is a substantially constant gain value and,
when the acquired number of signal lights at different wavelengths that are wavelength division multiplexed in the wavelength-multiplexed signal light is less than the threshold, one of the following conditions is satisfied:
the calculated target gain is an increasing gain value with respect to the constant gain value according to the acquired number of signal lights at different wavelengths that are wavelength division multiplexed in the wavelength-multiplexed signal light, and
the calculated target gain is a decreasing gain value with respect to the constant gain value according to the acquired number of signal lights at different wavelengths that are wavelength division multiplexed in the wavelength-multiplexed signal light; and
an optical amplifier to optically amplify the wavelength-multiplexed signal light with the calculated target gain, wherein the calculating unit calculates the target gain based on characteristics of the optical amplifier,
wherein the threshold is equal to or smaller than a number of signal lights at different wavelengths corresponding to 25% of a total number of signal lights at different wavelengths transmittable in the wavelength-multiplexed signal light in a wavelength multiplex optical transmission system.

12. An apparatus according to claim 11, wherein the characteristics of the optical amplifier on which the calculation of the target gain is based include fluctuation of output light power of the optical amplifier due to at least one of spectral hole burning (SHB), gain deviation and Stimulated Raman Scattering (SRS).

13. A method to amplify a wavelength-multiplexed signal light including a plurality of signal lights at different wavelengths that are wavelength division multiplexed, the method comprising:

demultiplexing the wavelength-multiplexed signal light into the plurality of signal lights at different wavelengths;
monitoring a power of each of the demultiplexed plurality of signal lights at different wavelengths;
acquiring, based on the monitored power, the number of signal lights at different wavelengths that are wavelength division multiplexed in the wavelength-multiplexed signal light;
calculating a target gain based on the acquired number of signal lights at different wavelengths that are wavelength division multiplexed in the wavelength-multiplexed signal light, the target gain being calculated so that,
when the acquired number of signal lights at different wavelengths that are wavelength division multiplexed in the wavelength-multiplexed signal light is larger than a threshold set in advance, the calculated target gain is a substantially constant gain value and, when the acquired number of signal lights at different wavelengths that are wavelength division multiplexed in the wavelength-multiplexed signal light is less than the threshold, one of the following conditions is satisfied:

the calculated target gain is an increasing gain value with respect to the constant gain value according to the acquired number of signal lights at different wavelengths that are wavelength division multiplexed in the wavelength-multiplexed signal light, and the calculated target gain is a decreasing gain value with respect to the constant gain value according to the acquired number of signal lights at different wavelengths that are wavelength division multiplexed in the wavelength-multiplexed signal light; and optically amplifying the wavelength-multiplexed signal light with the calculated target gain, wherein said calculating calculates the target gain based on characteristics of said optically amplifying, wherein the threshold is equal to or smaller than a number of signal lights at different wavelengths corresponding to 25% of a total number of signal lights at different wavelengths transmittable in the wavelength-multiplexed signal light in a wavelength multiplex optical transmission system.

14. A method according to claim 13, wherein the characteristics of said optically amplifying on which the calculation of the target gain is based include fluctuation of output light power of said optically amplifying due to at least one of spectral hole burning (SHB), gain deviation and Stimulated Raman Scattering (SRS).

* * * * *

UNITED STATES PATENT AND TRADEMARK OFFICE
CERTIFICATE OF CORRECTION

| | | |
|---|---|---|
| PATENT NO. | : 7,843,631 B2 | Page 1 of 1 |
| APPLICATION NO. | : 11/859842 | |
| DATED | : November 30, 2010 | |
| INVENTOR(S) | : Miki Onaka et al. | |

It is certified that error appears in the above-identified patent and that said Letters Patent is hereby corrected as shown below:

ON THE TITLE PAGE:
Column 2 (Other Publications), Line 1 delete "Nunierical" and insert -- Numerical --, therefor.

IN THE CLAIMS:
Column 18, Line 51 in Claim 4, delete "at least" and insert -- at at least --, therefor.

Column 19, Line 50 in Claim 8, delete "at least" and insert -- at at least --, therefor.

Signed and Sealed this
First Day of March, 2011

David J. Kappos
*Director of the United States Patent and Trademark Office*